United States Patent [19]
Tsai

[11] Patent Number: 5,883,727
[45] Date of Patent: Mar. 16, 1999

[54] MULTIPLE RESOLUTION IMAGE SCANNING MODULE

[76] Inventor: Shui Chuan Tsai, No.3, Alley 80, Lane 108, Sec.1, Kuang-fu Road, Hsin-chu, Taipei, Taiwan

[21] Appl. No.: 851,764

[22] Filed: May 6, 1997

[51] Int. Cl.⁶ .............................. H04N 1/04; H04N 1/36
[52] U.S. Cl. ...................... 358/475; 358/474; 358/412; 358/487
[58] Field of Search .................................. 358/474, 475, 358/494, 496, 497, 498, 483, 482, 408, 409, 412, 505, 506, 509, 487, 401, 501, 445, 451, 406; 250/234, 235, 236, 208.1; 355/45, 41, 55, 56, 67; 396/267; 359/742, 721; 356/71

[56] References Cited

U.S. PATENT DOCUMENTS

| | | | |
|---|---|---|---|
| Re. 30,231 | 3/1980 | Ikeda | 359/672 |
| 4,196,986 | 4/1980 | Moyroud | 396/267 |
| 4,750,021 | 6/1988 | Holroyd | 355/41 |
| 4,908,654 | 3/1990 | Holroyd | 355/41 |
| 4,942,425 | 7/1990 | Kamimura et al. | 355/45 |
| 5,260,831 | 11/1993 | Suzuki et al. | 359/742 |
| 5,680,205 | 10/1997 | Borza | 356/71 |

*Primary Examiner*—Edward L. Coles
*Assistant Examiner*—Cheukfan Lee
*Attorney, Agent, or Firm*—Pro-Techtor International Services

[57] ABSTRACT

The present invention refers to an image scanning module for creating an optical image of a scanned area illuminated by a light source, with light travelling from the scanned area to the optical image along a light path, the image scanning module operating at various resolutions and comprising: a charge-coupled device; at least two lenses, mounted at a mutual transverse distance in front of the charge-coupled device and alternatively brought into the light path, such that the optical image of the scanned area is created on the charge-coupled device; at least two mirror groups, alternatively brought into the light path, with each of the lenses mounted behind one of the mirror groups; and a moving device, moving the lenses and the mirror groups simultaneously between transverse positions; wherein for each of the transverse positions, one of the mirror groups, one of the lenses and the charge-coupled device are aligned and the image scanning module operates at one of the various resolutions, with the light path having various lengths for the various resolutions, in a way that the optical image of the scanned area has a nearly constant intensity for the various resolutions and the image scanning module is of compact size.

14 Claims, 47 Drawing Sheets

B-B

E-E

N-N

W—W

X—X

MULTIPLE RESOLUTION IMAGE SCANNING MODULE

BACKGROUND OF THE INVENTION

1. Field of the Invention

The present invention relates to a multiple resolution image scanning module, particularly to an image scanning module of compact size, which allows for a scanning signal of nearly constant intensity under various resolutions.

2. Description of Related Art

Image scanning modules mainly comprise a light source, a reflective mirror, a lens, and a charge-coupled device (CCD). The number and size of the pixels of the CCD determine the optical properties of the image scanning module. For instance, flatbed scanners operate with charge-coupled devices which have 2700 pixels in one dimension. As the size of the scanned image is 8.5 inch in this dimension, a resolution of 300 dpi is attained. The resolution is a decisive factor for the quality of the image. For satisfactory quality, different kinds of images, like text, photographs, etc. require different resolutions (like 300 dpi, 400 dpi, 600 dpi, or 1000 dpi). So it is desirable to be able to choose the appropriate resolution on the image scanning module.

Conventional scanners are provided with image scanning modules for fixed resolutions. In a given conventional scanner, there is no way to change the scanned area or the resolution. For more than one resolution, several different image scanning modules have to be used.

In order to provide more flexibility, multiple resolution image scanning modules have entered the market, exemplified by Taiwan patents no. 232398 and 269416. Therein, image scanning modules are disclosed, having a reflective mirror and a constant distance between the scanned object and the charge-coupled device (CCD). Two lenses for two different resolutions are provided. The user switches between the lenses for the desired resolution. However, since the focal lengths of the two lenses are different, the lenses have to be mounted in different positions (as shown in FIG. 27). A large volume is needed, and thus the size of the image scanning module for multiple resolutions is increased. Furthermore, since the distance between the scanned object and the CCD is constant for different resolutions, at a high resolution the scanned area is smaller than at a low resolution, and the light intensity on the CCD becomes lower, leading to a lower signal, which is harder to process.

SUMMARY OF THE INVENTION

The main object of the present invention is to provide a multiple resolution image scanning module, which provides signals of about the same intensity for various resolutions.

Another object of the present invention is to provide a multiple resolution image scanning module, which accommodates all lenses for various resolutions in a small volume, thereby allowing for a small size.

The present invention can be more fully understood by reference to the following description and accompanying drawings.

DETAILED DESCRIPTION OF THE PREFERRED EMBODIMENTS

Figure 1:
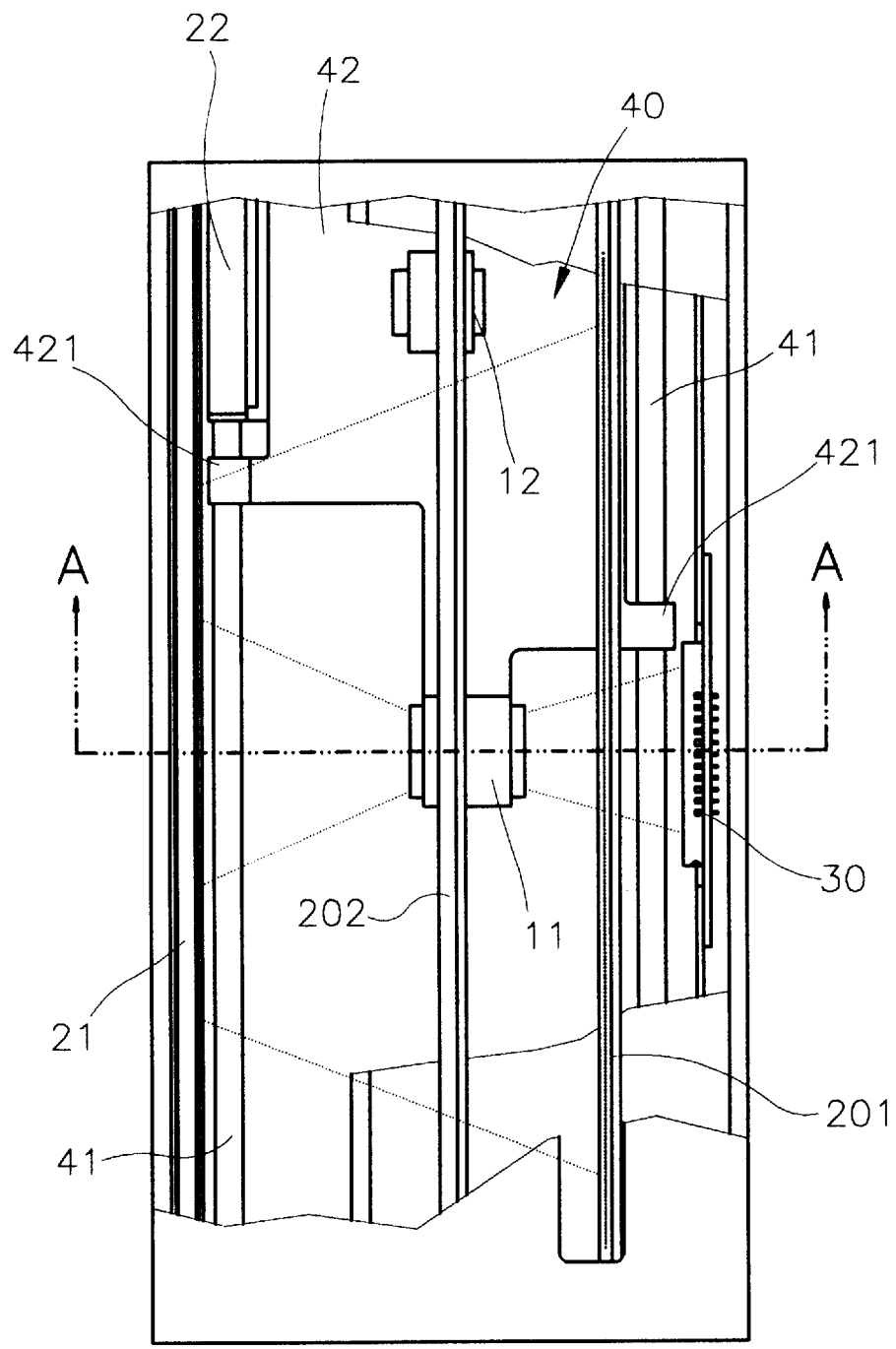
FIG. 1 is a schematic illustration of the structural parts in the low resolution state of the present invention in a first embodiment.
Figure 2:
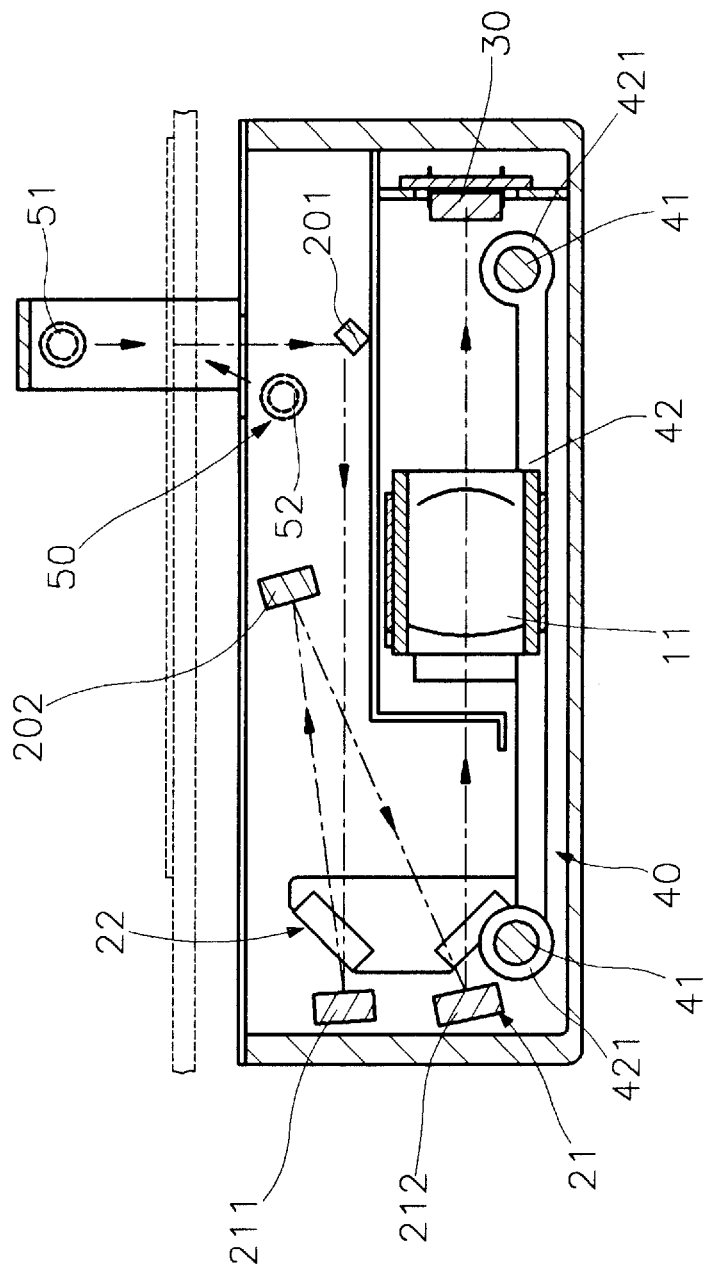
FIG. 2 is a cross-sectional view, taken along the line A—A in FIG. 1.

As shown in FIGS. 1–46, the multiple resolution image scanning module of the present invention is provided with at least two lenses 11, 12. The lenses 11, 12 are horizontally movable and alternatively brought into a light path. A longitudinal axis is defined by the section of the light path through the lenses 11, 12. In front of the lenses 11, 12 at least two mirror groups 21, 22 are mounted. Behind the lenses 11, 12 a charge-coupled device (CCD) 30 is mounted. A light source 50 illuminates the area to be scanned. From there, light is reflected by one of the mirror groups 21, 22 and passes through one of the lenses 11, 12 to the CCD. When the resolution is changed, the lenses 11, 12 are moved, and the mirror groups 21, 22 are rearranged, or the CCD 30 is moved, so as to change the light path from the light source 50 to the CCD 30. By the geometry of the setup, the signal on the CCD 30 is of nearly the same intensity for various resolutions.

As shown in FIGS. 1–16, the at least two lenses 11, 12 are mounted on a moving device 40, which allows to change the position of the lenses 11, 12. During operation, one of the lenses 11, 12 is brought in front of the CCD 30, so as to transmit an optical signal onto the CCD 30.

The moving device 40 has several rails 41, which are oriented transverse to the light path through the lenses 11, 12, while not interfering with the light path. A moving support 42 with a back end and a front end is set transversely on the rails 41. The moving support 42 has several gliders 421, each of them surrounding a rail 41 on the cross-section thereof and gliding thereon. The lenses 11, 12 are mounted on the back end of the moving device 40, the mirror group 22 is mounted on the front end thereof, moving along with the lenses 11, 12.

The mirror group 21 is mounted in a fixed position in front of the lenses 11, 12. The mirror group 22 moves along with lens 12. The length of the light path from the light source 50 to the CCD 30 depends on which of the mirror groups 21, 22 is used for reflection.

Depending on the resolution selected, one of the at least two lenses 11, 12 and, simultaneously, one of the at least two mirror groups 21, 22 are brought into the light path. The resolution is changed by shifting the moving device 40, taking along the lenses 11, 12 and the non-fixed mirror group(s). So either the fixed mirror group 21 and lens 11 or one of the non-fixed mirror groups (there is at least one) and another lens are in the light path.

Referring to FIGS. 1–4, the multiple resolution image scanning module of the present invention in a first embodiment at a low resolution has the mirror group 21 and the lens 11 in a position opposite to the CCD 30. The mirror group 21 comprises an upper mirror 211 and a lower mirror 212. The light source 50 is a reflection light source 52, the generated light being reflected on the area to be scanned, or a transmission light source 51, the generated light being transmitted through the area to be scanned. From there, the light is reflected by a first fixed mirror 201, the upper mirror 211, a second fixed mirror 202, and the lower mirror 212. Then the light passes through lens 11 to reach the CCD 30.

Figure 3:
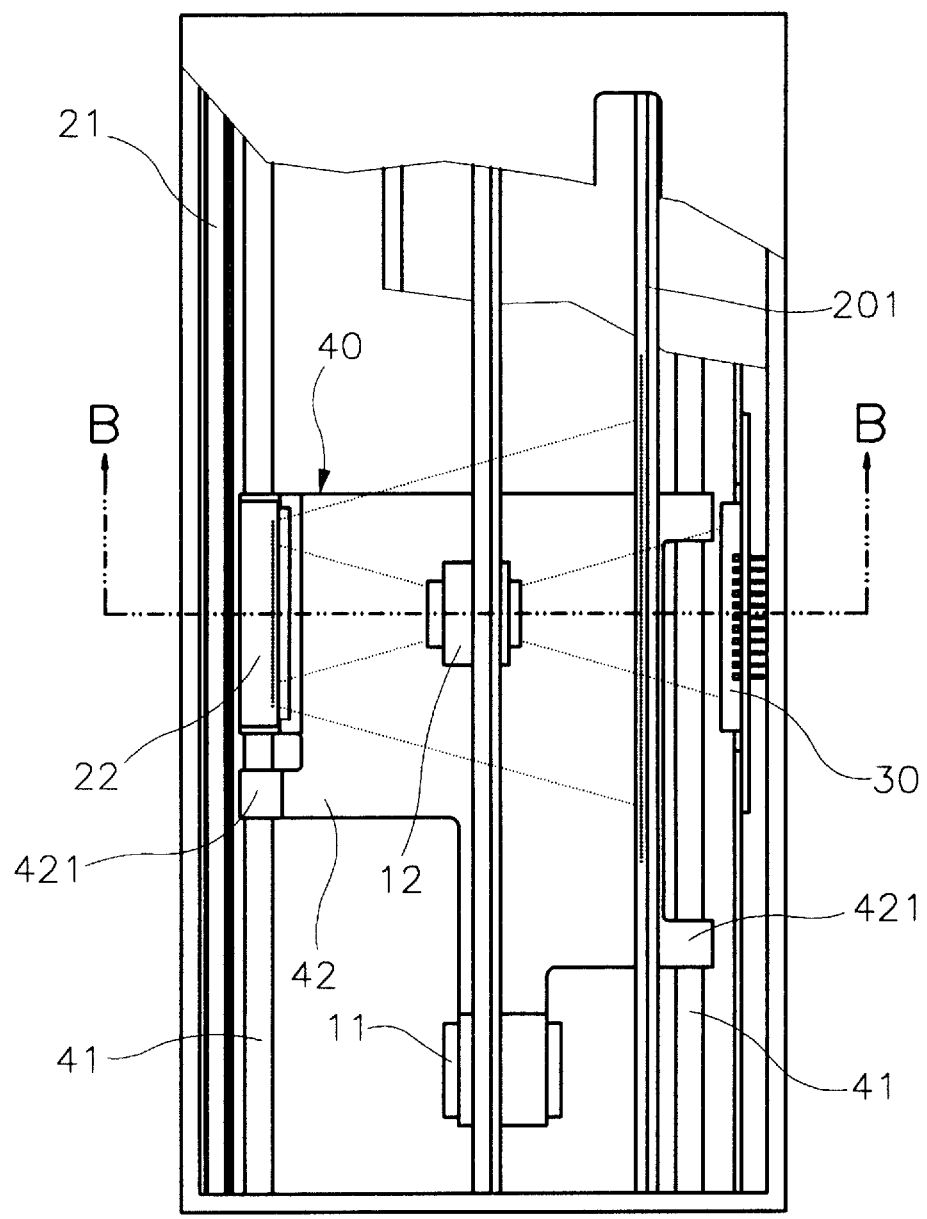
FIG. 3 is a schematic illustration of the structural parts in the high resolution state of the present invention in a first embodiment.
Figure 4:
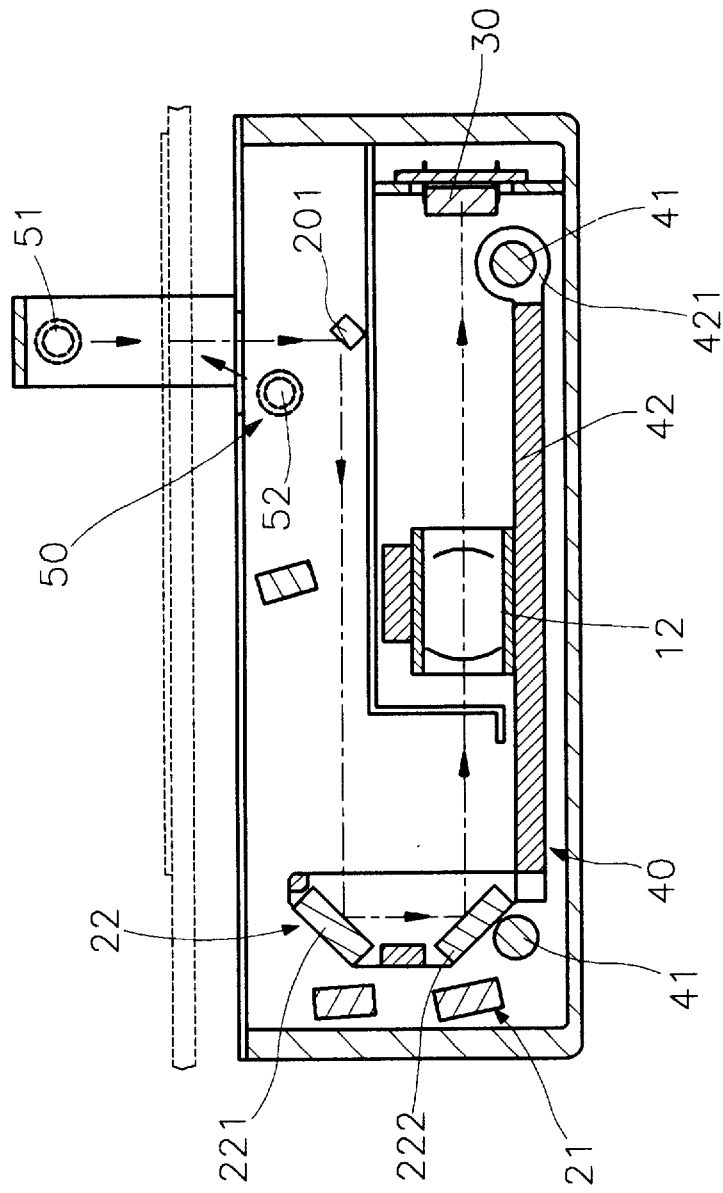
FIG. 4 is a cross-sectional view, taken along the line B—B in FIG. 3.

As shown in FIGS. 3 and 4, at high resolution, the mirror group 22 and the lens 12 are positioned opposite to the CCD 30. The mirror group 22 comprises an upper mirror 221 and a lower mirror 222. Since the distance between the mirror group 21 and the lenses 11, 12 is different from the distance between the mirror group 21 and the lenses 11, 12, the mirror groups 21, 22 do not interfere with each other. At high resolution, the light generated by the light source 50 and coming from the scanned area is reflected by the first fixed mirror 201, the upper mirror 221, and the lower mirror 222. Then the light passes through lens 12 to reach the CCD 30. The upper and lower mirrors 221, 222 are arranged in a way, that the light from the area to be scanned is not reflected from the upper mirror 221 to the second fixed mirror 202, but rather directly to the lower mirror 222. The section of the light path between the scanned area and the lens is thereby shortened considerably, while the length of the section of the light path between the lens and the CCD 30 is nearly the same for all resolutions. Therefore, the intensity of the light signal at the CCD 30 is nearly the same for all resolutions, as well.

Since the lenses 11, 12 are set on nearly the same longitudinal position and the light paths for different resolutions are determined by the arrangement of the mirror groups 21, 22, the overall longitudinal extension of the image scanning module of the present invention is kept small.

Figure 5:
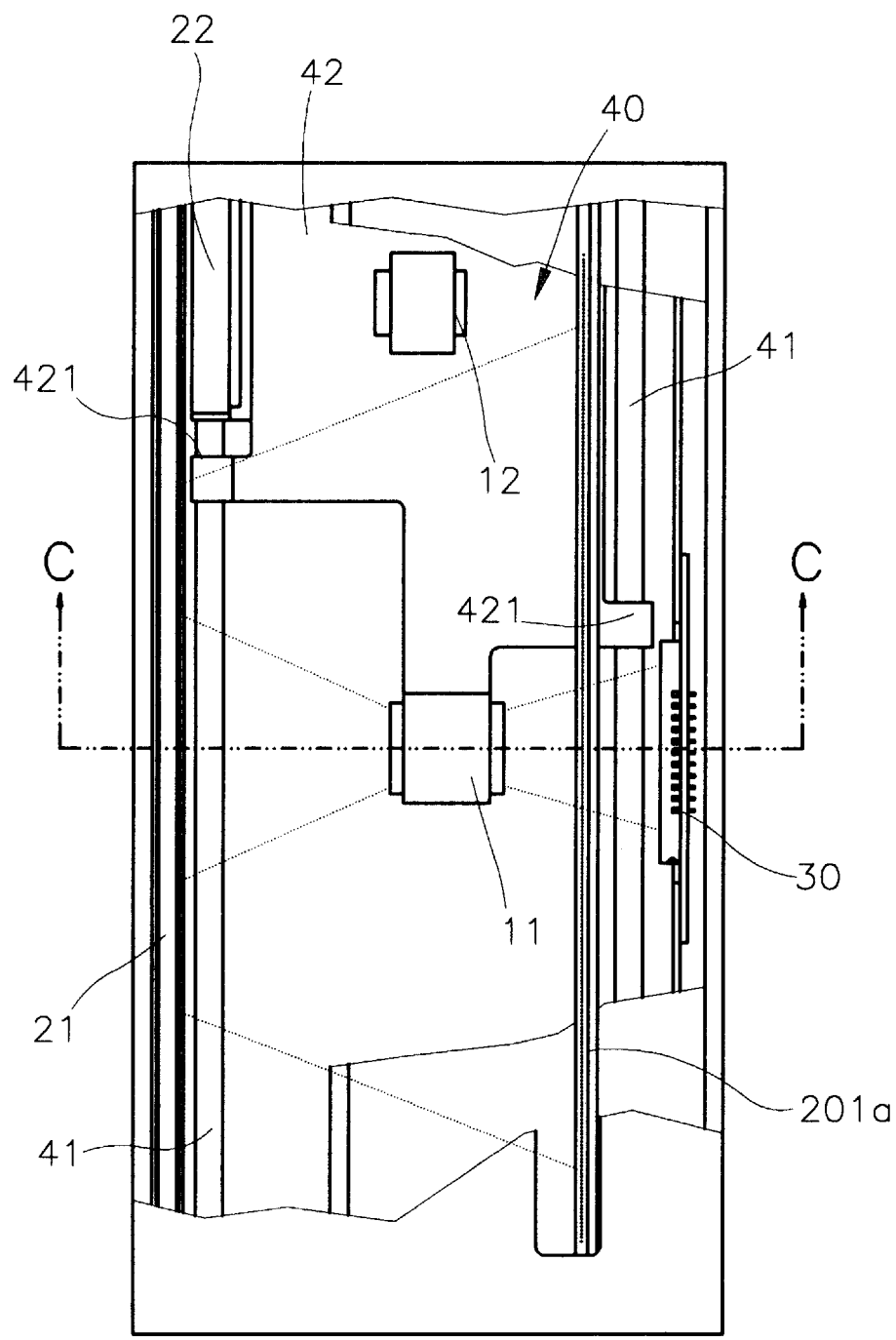
FIG. 5 is a schematic illustration of the structural parts in the low resolution state of the present invention in a second embodiment.
Figure 6:
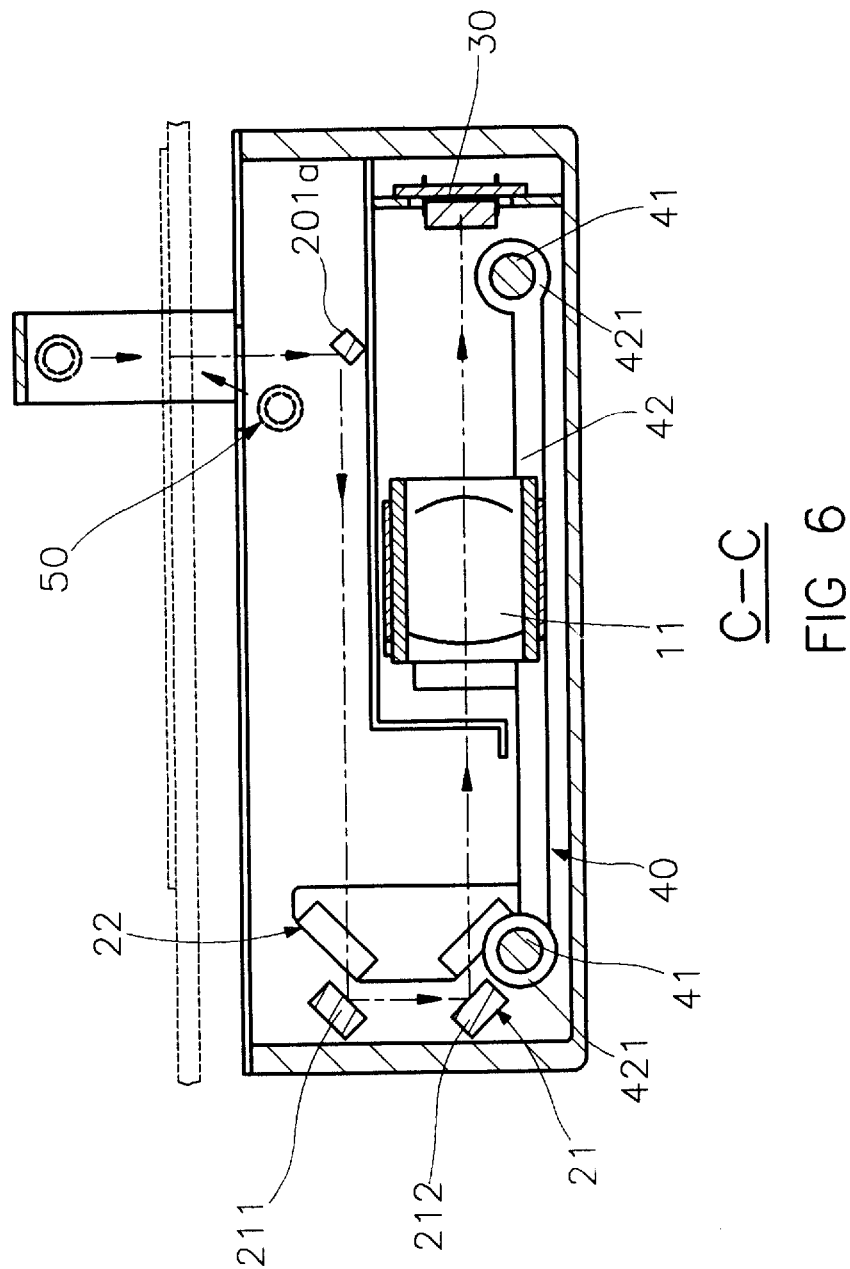
FIG. 6 is a cross-sectional view, taken along the line C—C in FIG. 5.
Figure 7:
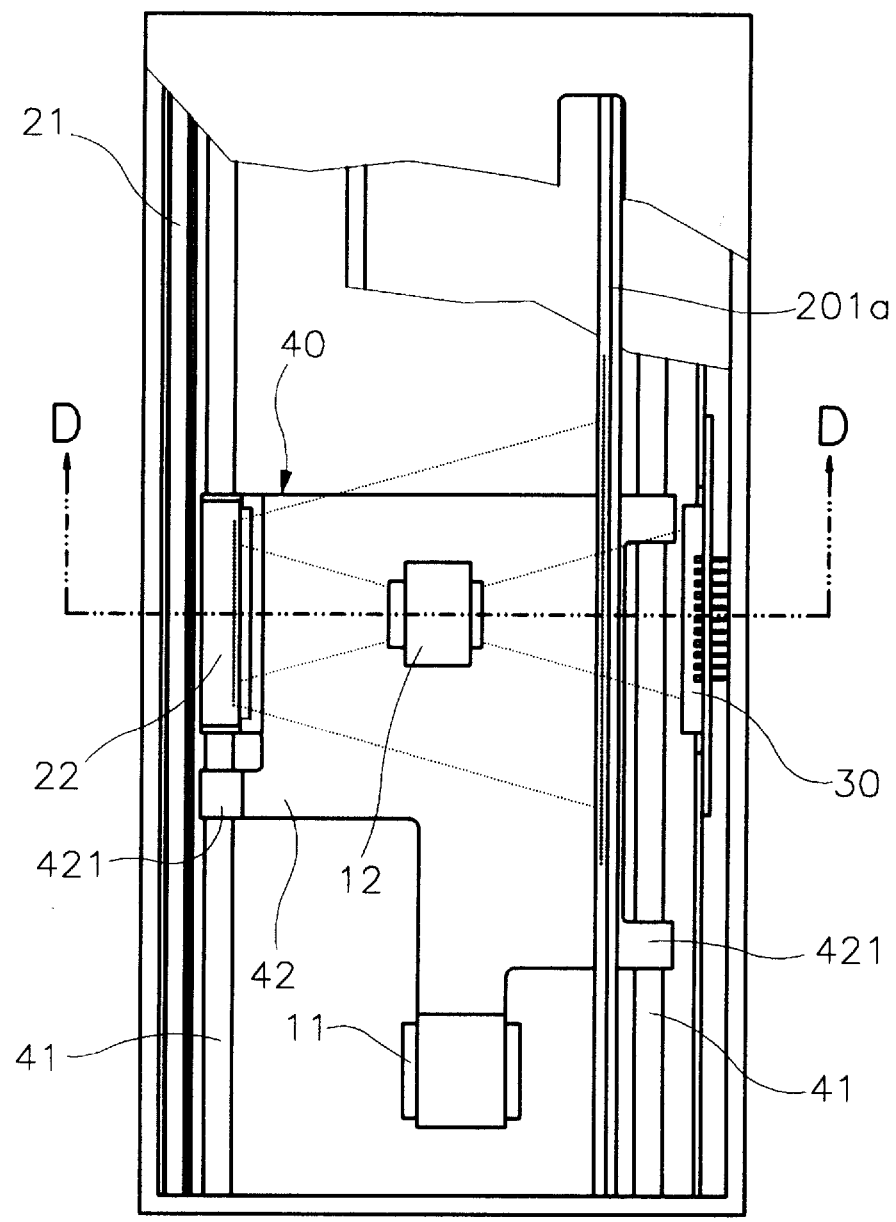
FIG. 7 is a schematic illustration of the structural parts in the high resolution state of the present invention in a second embodiment.
Figure 8:
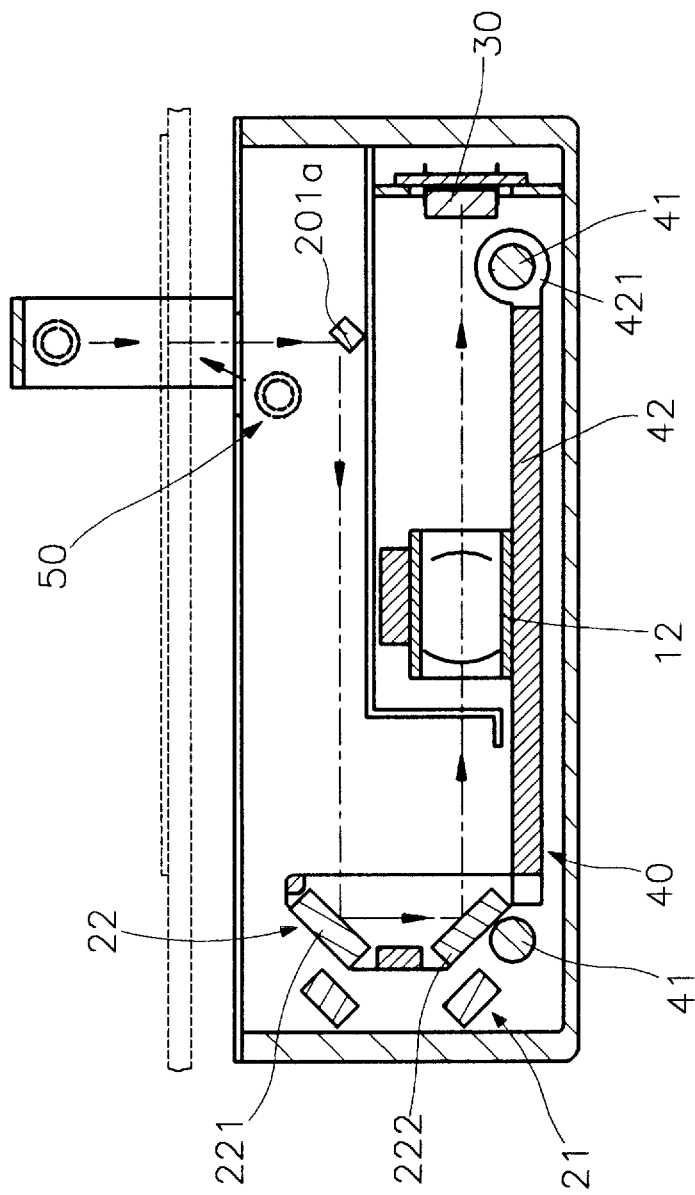
FIG. 8 is a cross-sectional view, taken along the line D—D in FIG. 7.

Referring to FIGS. 5–8, in a second embodiment of the present invention, for all of the at least two mirror groups 21, 22, the upper and lower mirrors 211, 212 and 221, 222 are mounted at equal mutual angles. The light source 50 illuminates the scanned area. At low resolution, from there, the light is reflected by an oblique fixed mirror 201a, the upper mirror 211 of the mirror group 21, and the lower mirror 212 of the mirror group 21. Then the light passes through lens 11 to reach the CCD 30 (as shown in FIGS. 5 and 6). At high resolution, the mirror group 22 and lens 12 are brought in a position opposite to the CCD 30. Then the light coming from the scanned area is reflected by the fixed mirror 201a, the upper mirror 221 of the mirror group 22, and the lower mirror 222 of the mirror group 22. Then the light passes through lens 12 to reach the CCD 30 (as shown in FIGS. 7 and 8).

Figure 9:
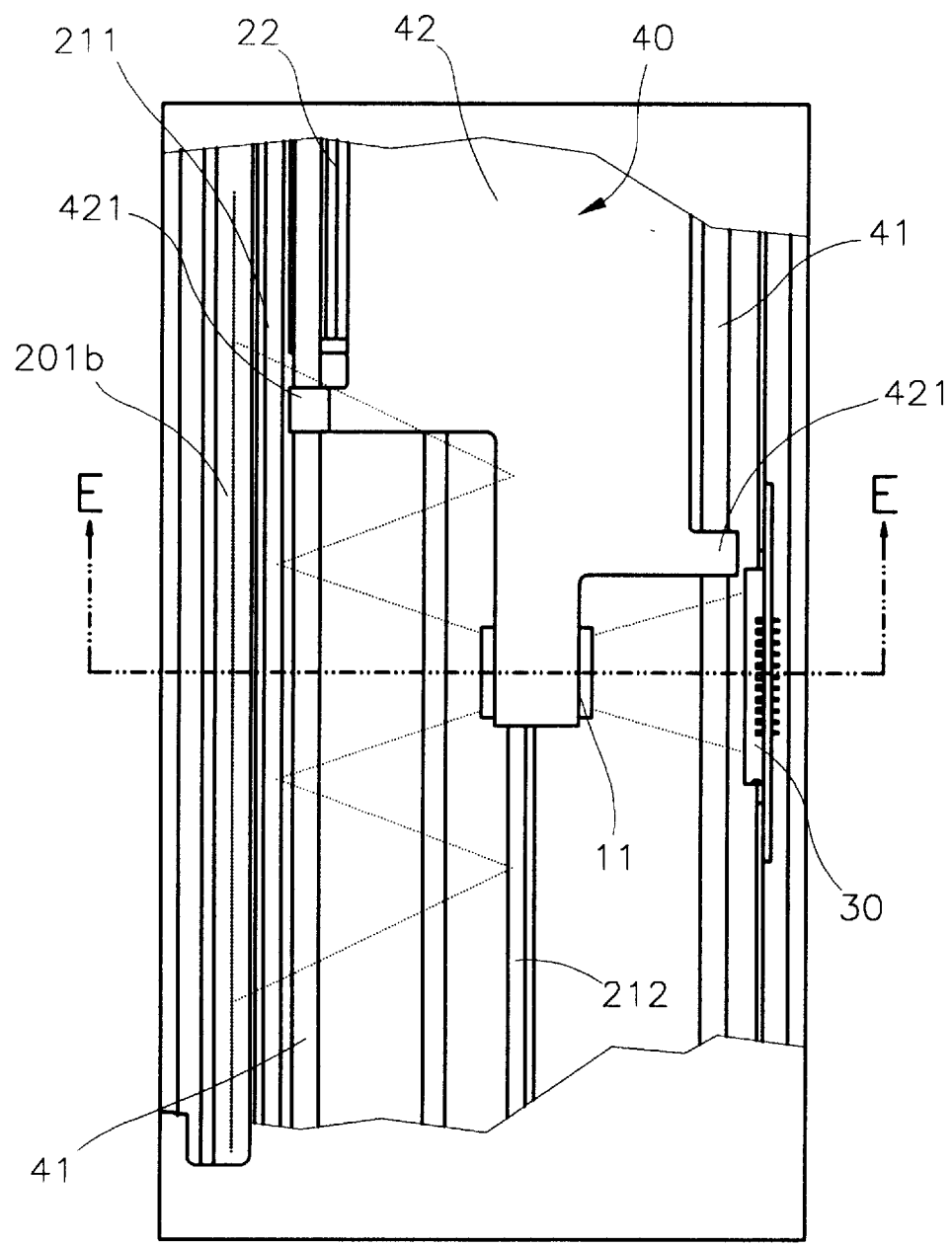
FIG. 9 is a schematic illustration of the structural parts in the low resolution state of the present invention in a third embodiment.
Figure 10:
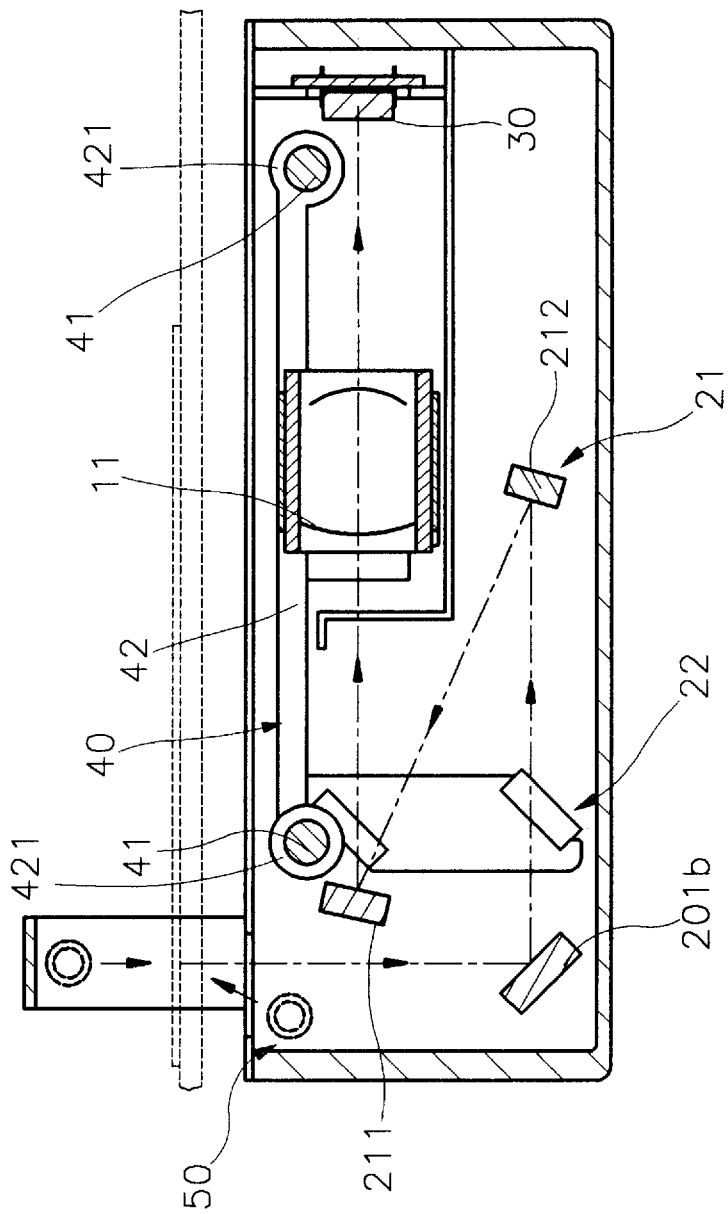
FIG. 10 is a cross-sectional view, taken along the line E—E in FIG. 9.
Figure 11:
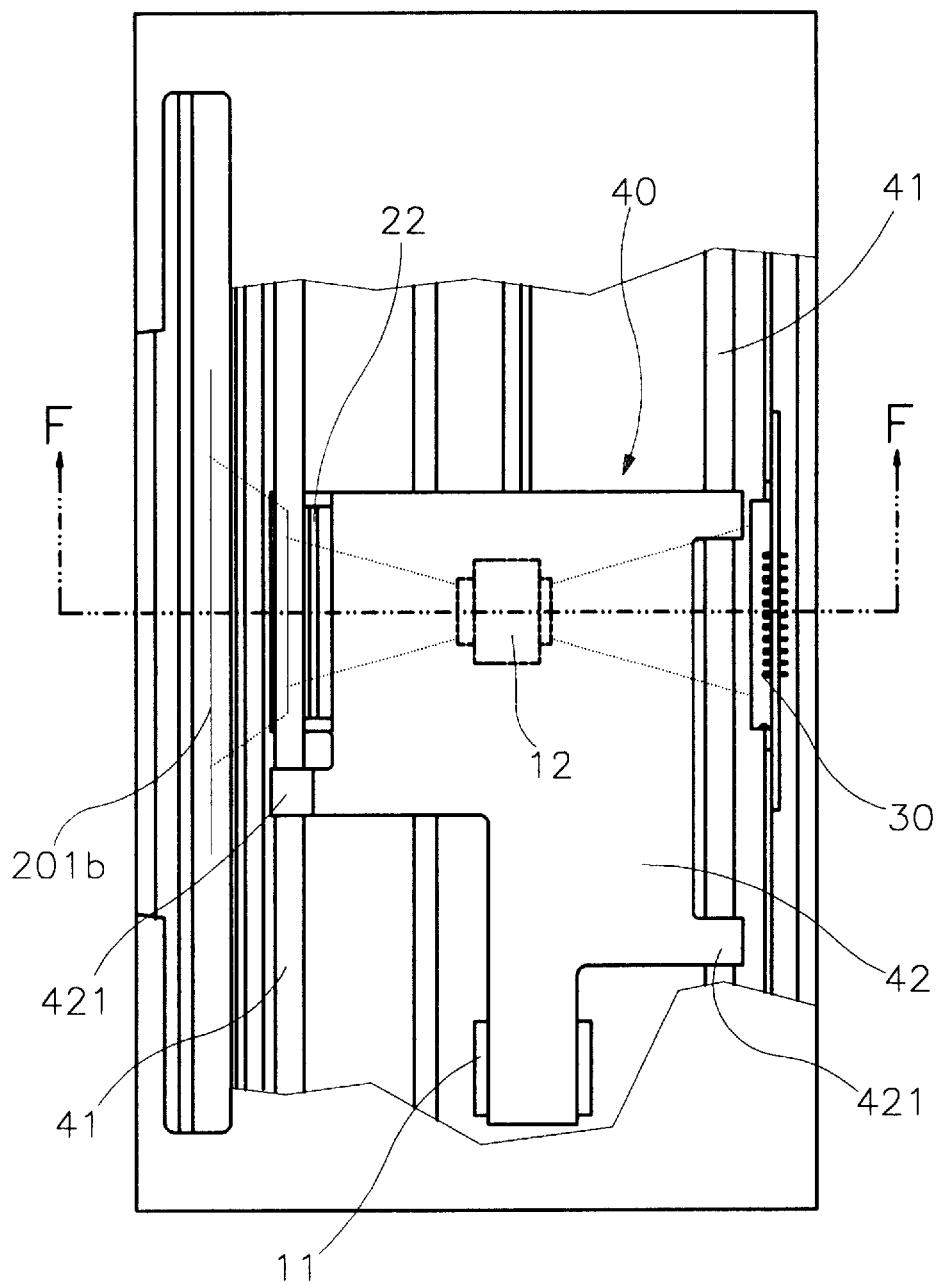
FIG. 11 is a schematic illustration of the structural parts in the high resolution state of the present invention in a third embodiment.
Figure 12:
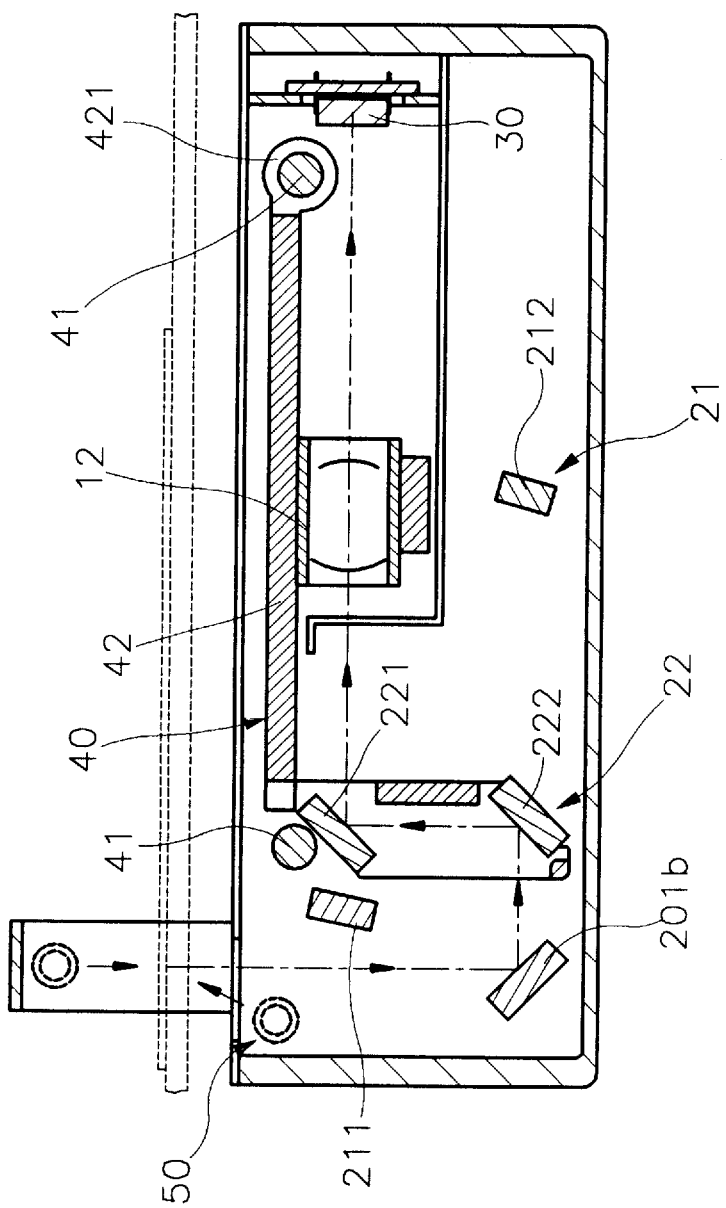
FIG. 12 is a cross-sectional view, taken along the line F—F in FIG. 11.

Referring to FIGS. 9–12, in a third embodiment of the present invention, the upper and lower mirrors 211, 212 of the mirror group 21 are not mounted vertically above each other, but rather at a longitudinal distance to each other. The light source 50 illuminates the scanned area. At low resolution, from there, the light is reflected by an oblique fixed mirror 201b, the lower mirror 212 of the mirror group 21, and the upper mirror 211 of the mirror group 21. Then the light passes through lens 11 to reach the CCD 30 (as shown in FIGS. 9 and 10). At high resolution, the mirror group 22 and lens 12 are brought in a position opposite to the CCD 30. Then the light coming from the scanned area is reflected by the fixed mirror 201b, the lower mirror 222 of the mirror group 22, and the upper mirror 221 of the mirror group 22. Then the light passes through lens 12 to reach the CCD 30 (as shown in FIGS. 11 and 12).

Figure 13:
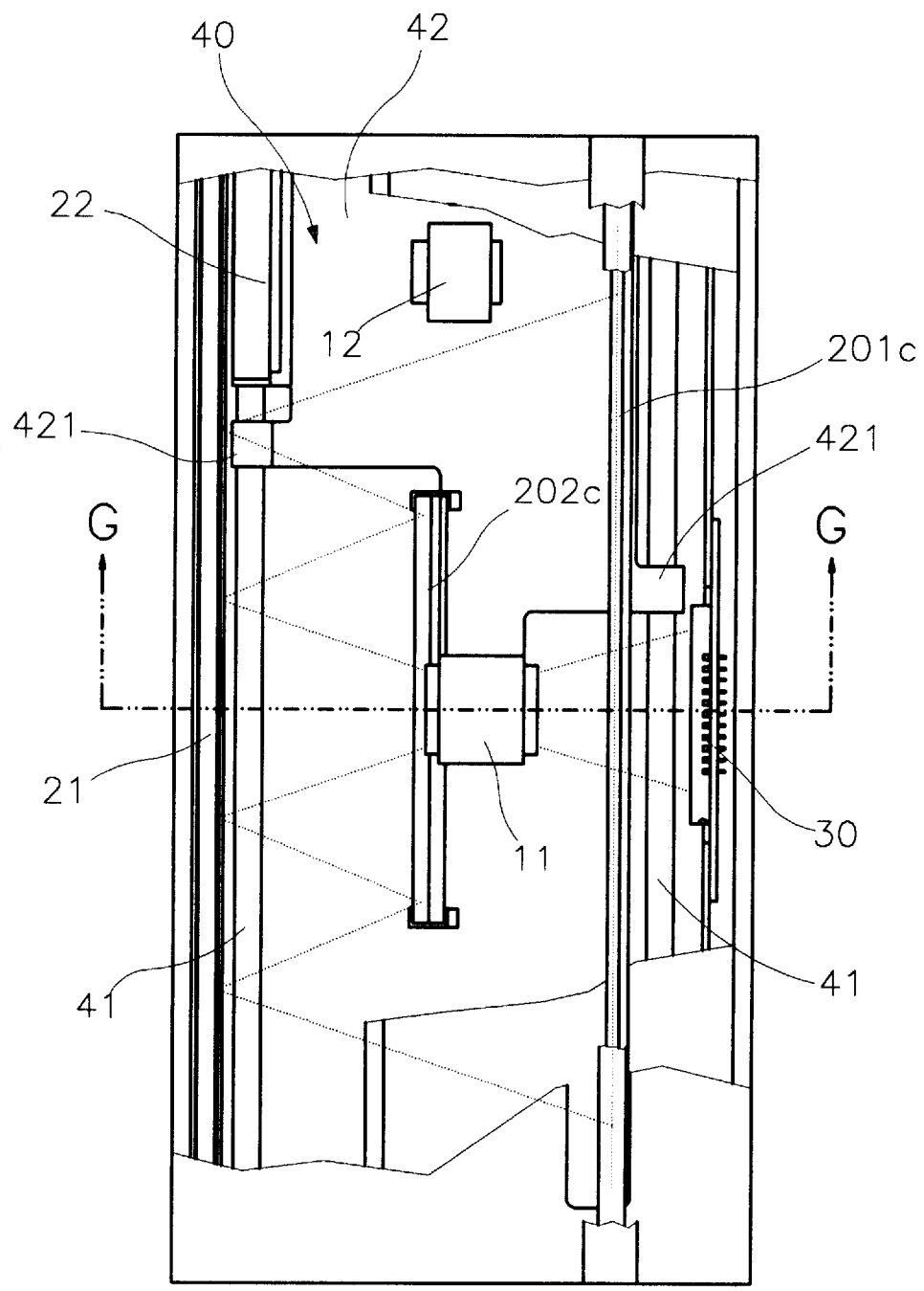
FIG. 13 is a schematic illustration of the structural parts in the low resolution state of the present invention in a fourth embodiment.
Figure 14:
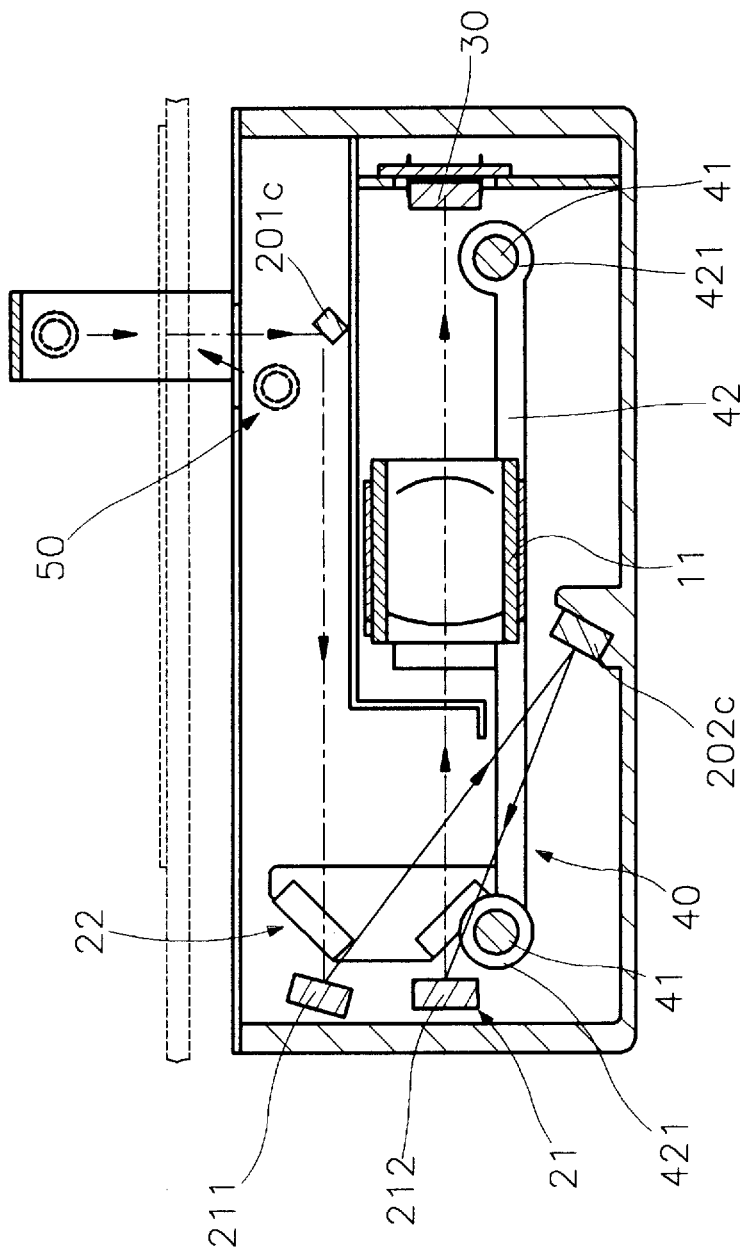
FIG. 14 is a cross-sectional view, taken along the line G—G in FIG. 13.
Figure 15:
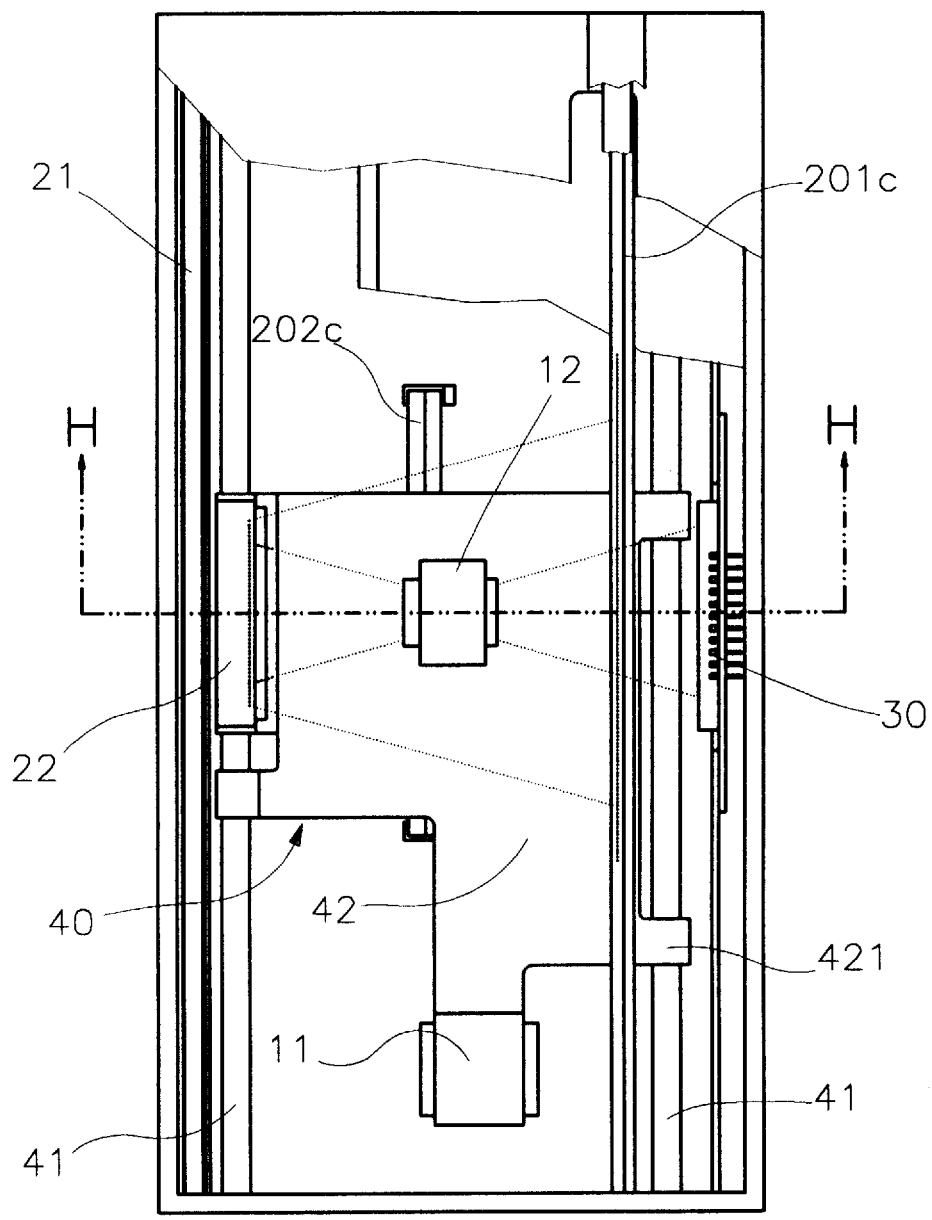
FIG. 15 is a schematic illustration of the structural parts in the high resolution state of the present invention in a fourth embodiment.
Figure 16:
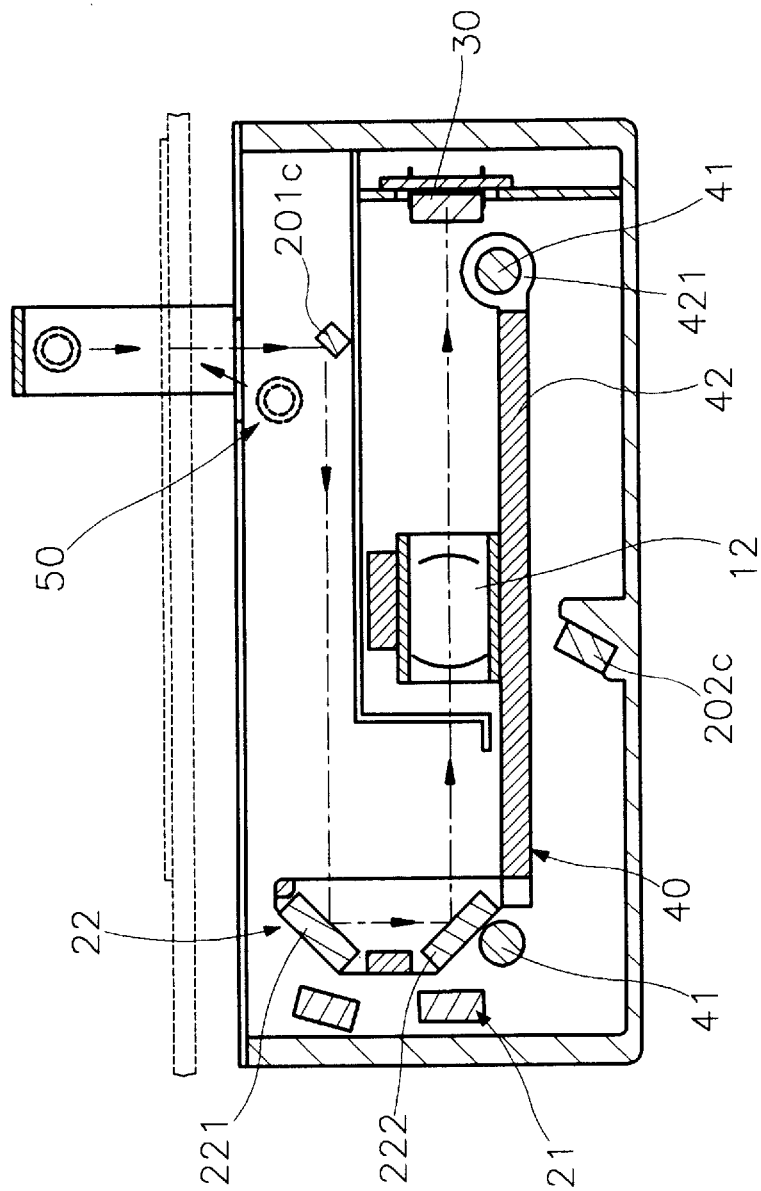
FIG. 16 is a cross-sectional view, taken along the line H—H in FIG. 15.

Referring to FIGS. 13–16, in a fourth embodiment of the present invention, the at least two lenses 11, 12 and the CCD 30 are mounted at medium height. The light source 50 illuminates the scanned area. At low resolution, from there, the light is reflected by an oblique first fixed mirror 201c, the upper mirror 211 of the mirror group 21, a second fixed mirror 202c, and the lower mirror 212 of the mirror group 21. Then the light passes through lens 11 to reach the CCD 30 (as shown in FIGS. 13 and 14). At high resolution, the mirror group 22 and lens 12 are brought in a position opposite to the CCD 30. Then the light coming from the scanned area is reflected by the first fixed mirror 201c, the upper mirror 221 of the mirror group 22, and the lower mirror 222 of the mirror group 22. Then the light passes through lens 12 to reach the CCD 30 (as shown in FIGS. 15 and 16).

Figure 17:
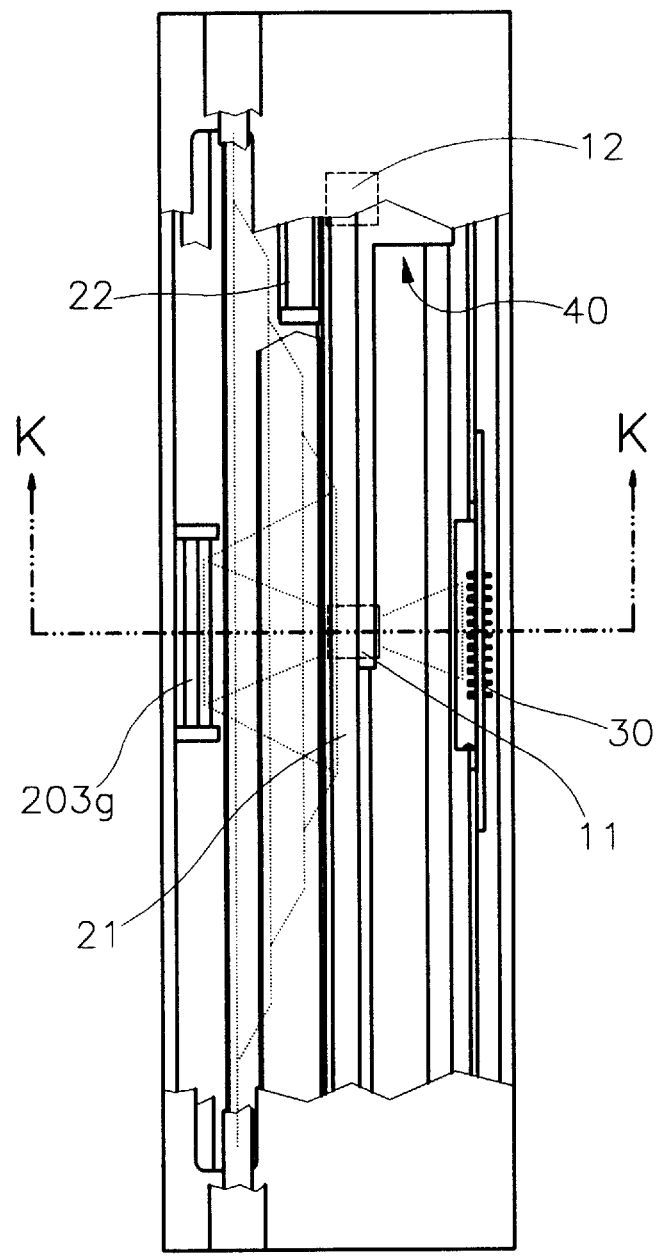
FIG. 17 is a schematic illustration of the structural parts in the low resolution state of the present invention in a fifth embodiment.
Figure 18:
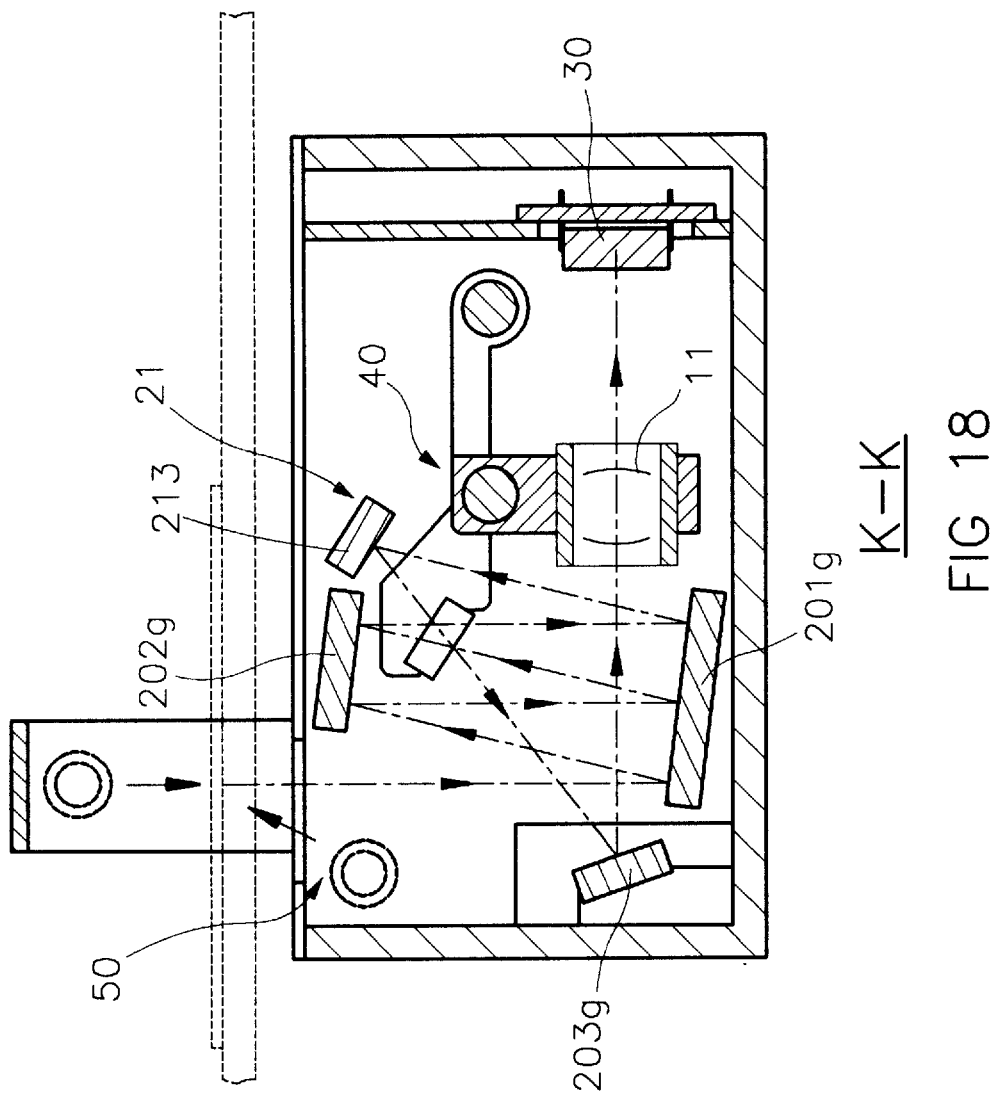
FIG. 18 is a cross-sectional view, taken along the line K—K in FIG. 17.
Figure 19:
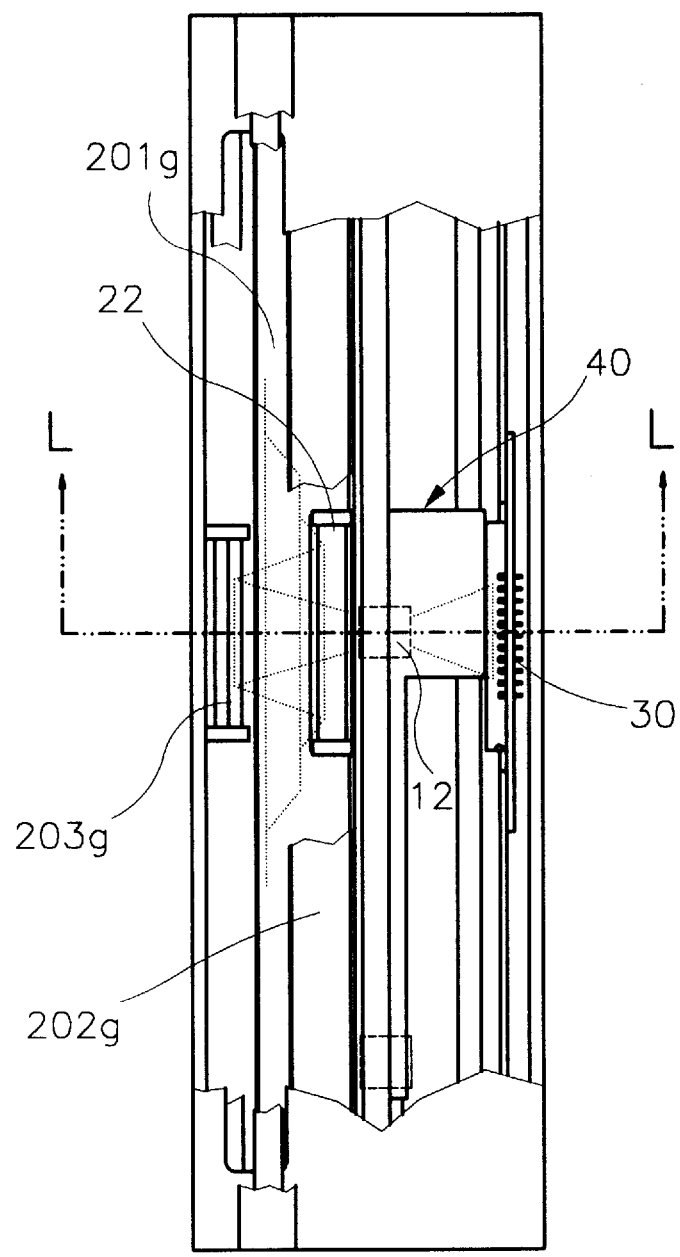
FIG. 19 is a schematic illustration of the structural parts in the high resolution state of the present invention in a fifth embodiment.
Figure 20:
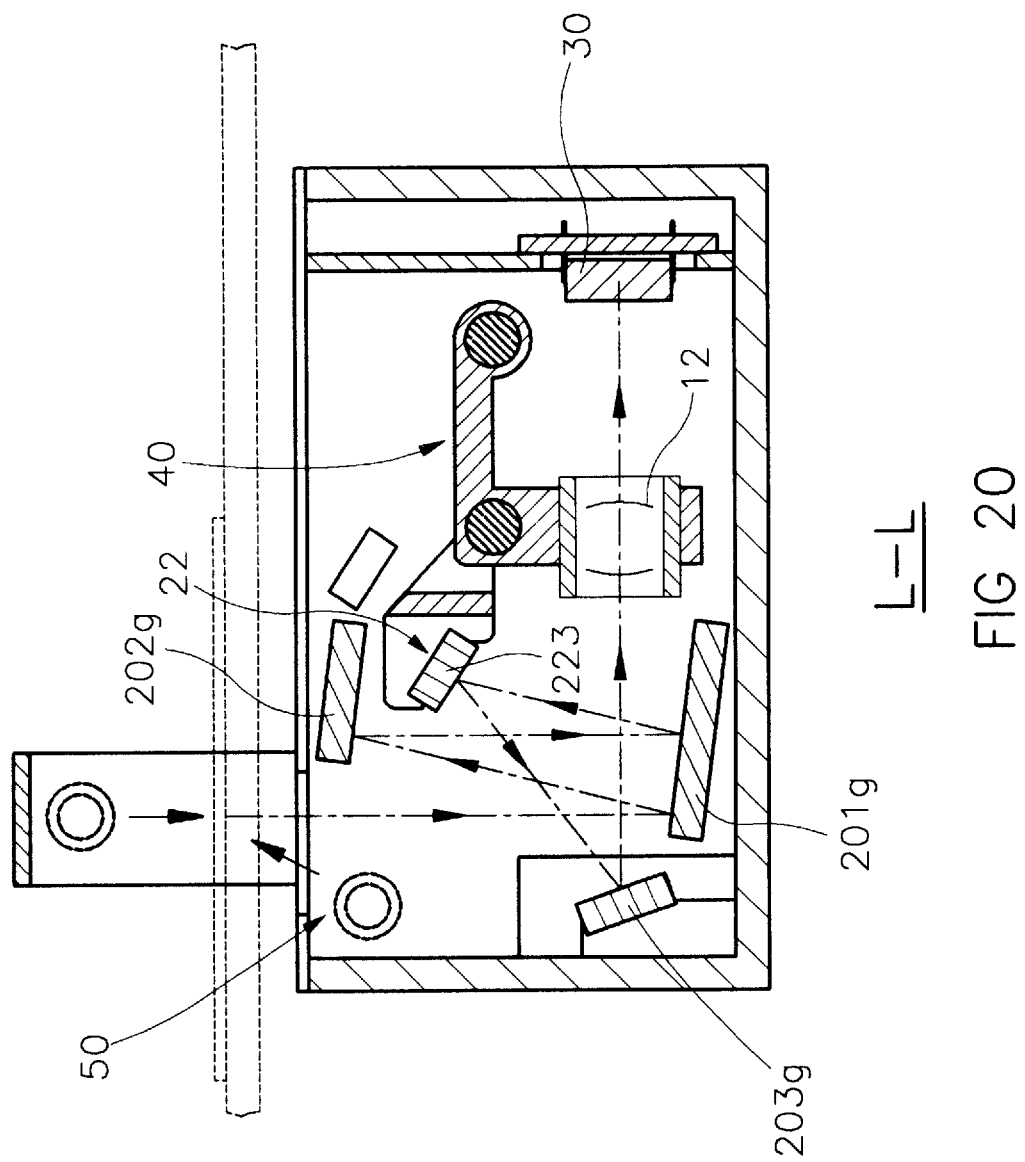
FIG. 20 is a cross-sectional view, taken along the line L—L in FIG. 19.

Referring to FIGS. 17–20, in a fifth embodiment of the present invention, the mirror groups 21 and 22 have one mirror 213 and 223, respectively. The light source 50 illuminates the scanned area. At low resolution, from there, the light is reflected by a first fixed mirror 201g and a second fixed mirror 202g. The angle between the first and second fixed mirrors 201g and 202g is small. So the light is reflected several times between the first and second fixed mirrors 201g and 202g. Then the light is reflected by the mirror 213 of the mirror group 21 and by a third fixed mirror 203g and passes through lens 11 to reach the CCD 30 (as shown in FIGS. 17 and 18). At high resolution, the mirror group 22 and lens 12 are brought in a position opposite to the CCD 30. Then the light coming from the scanned area is reflected by the first and second fixed mirrors 201g and 202g several times, but less often than at low resolution. Then the light is reflected by the mirror 223 of the mirror group 22 and by the third fixed mirror 203g and passes through lens 12 to reach the CCD 30 (as shown in FIGS. 19 and 20).

Figure 21:
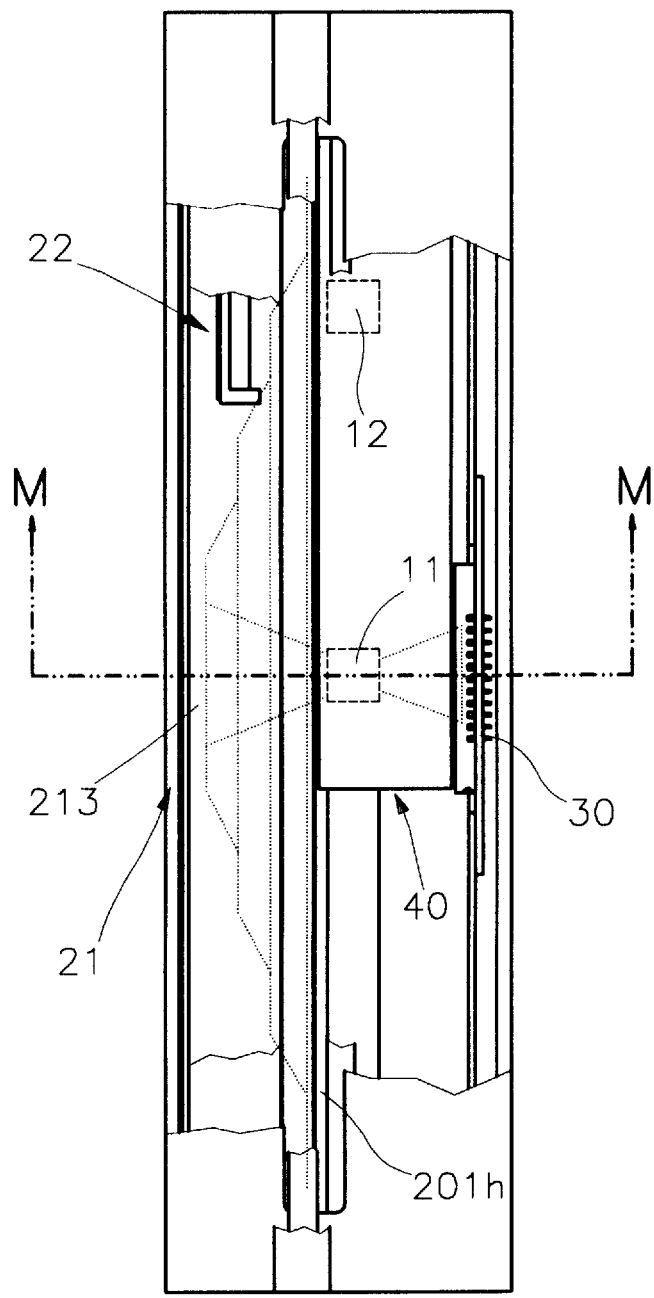
FIG. 21 is a schematic illustration of the structural parts in the low resolution state of the present invention in a sixth embodiment.
Figure 22:
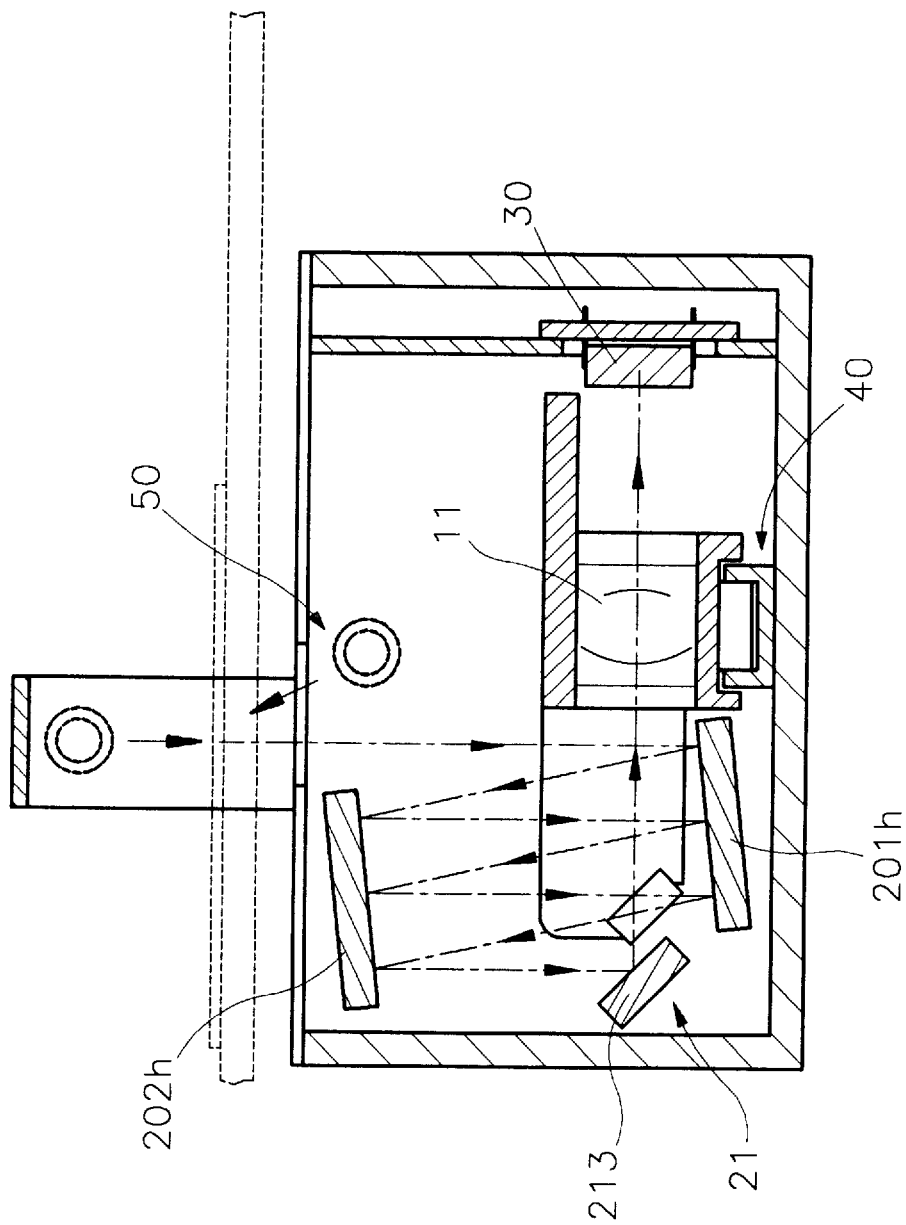
FIG. 22 is a cross-sectional view, taken along the line M—M in FIG. 21.
Figure 23:
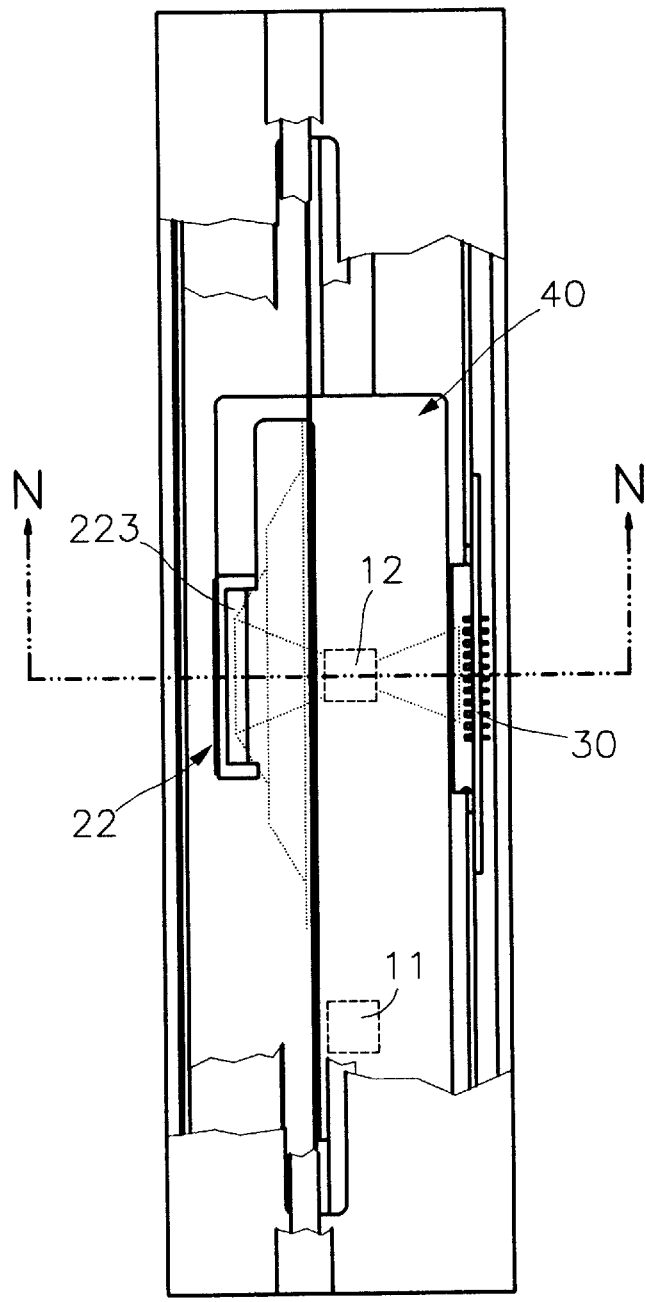
FIG. 23 is a schematic illustration of the structural parts in the high resolution state of the present invention in a sixth embodiment.
Figure 24:
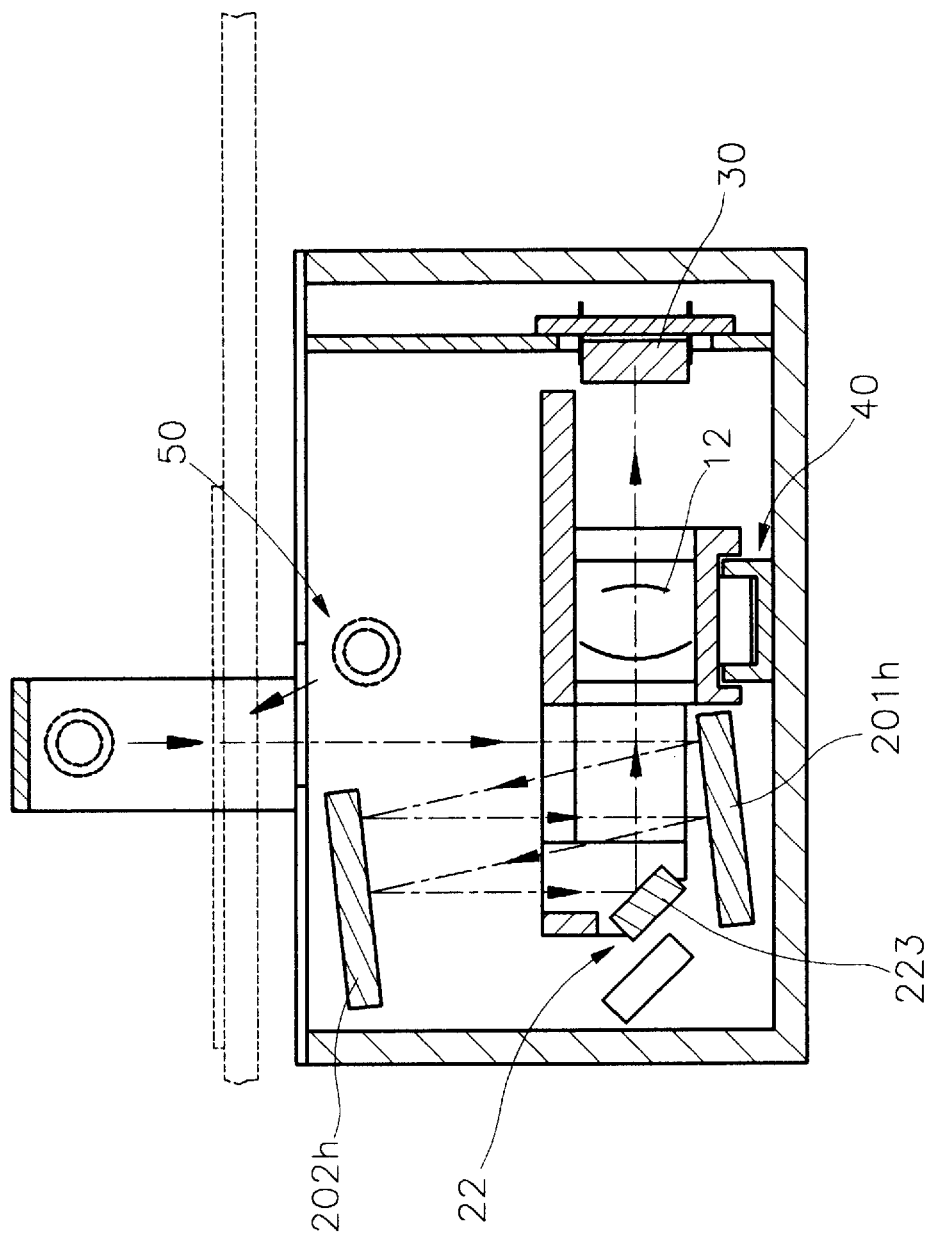
FIG. 24 is a cross-sectional view, taken along the line N—N in FIG. 23.

Referring to FIGS. 21–24, in a sixth embodiment of the present invention, the mirror groups 21 and 22 have one mirror 213 and 223, respectively. The light source 50 illuminates the scanned area. At low resolution, from there, the light is reflected by a first fixed mirror 201h and a second fixed mirror 202h. The angle between the first and second fixed mirrors 201h and 202h is small. So the light is reflected several times between the first and second fixed mirrors 201h and 202h. Then the light is reflected by the mirror 213 of the mirror group 21 and passes through lens 11 to reach the CCD 30 (as shown in FIGS. 21 and 22). At high resolution, the mirror group 22 and lens 12 are brought in a position opposite to the CCD 30. Then the light coming from the scanned area is reflected by the first and second fixed mirrors 201h and 202h several times, but less often than at low resolution. Then the light is reflected by the mirror 223 of the mirror group 22 and passes through lens 12 to reach the CCD 30 (as shown in FIGS. 23 and 24).

Figure 25:
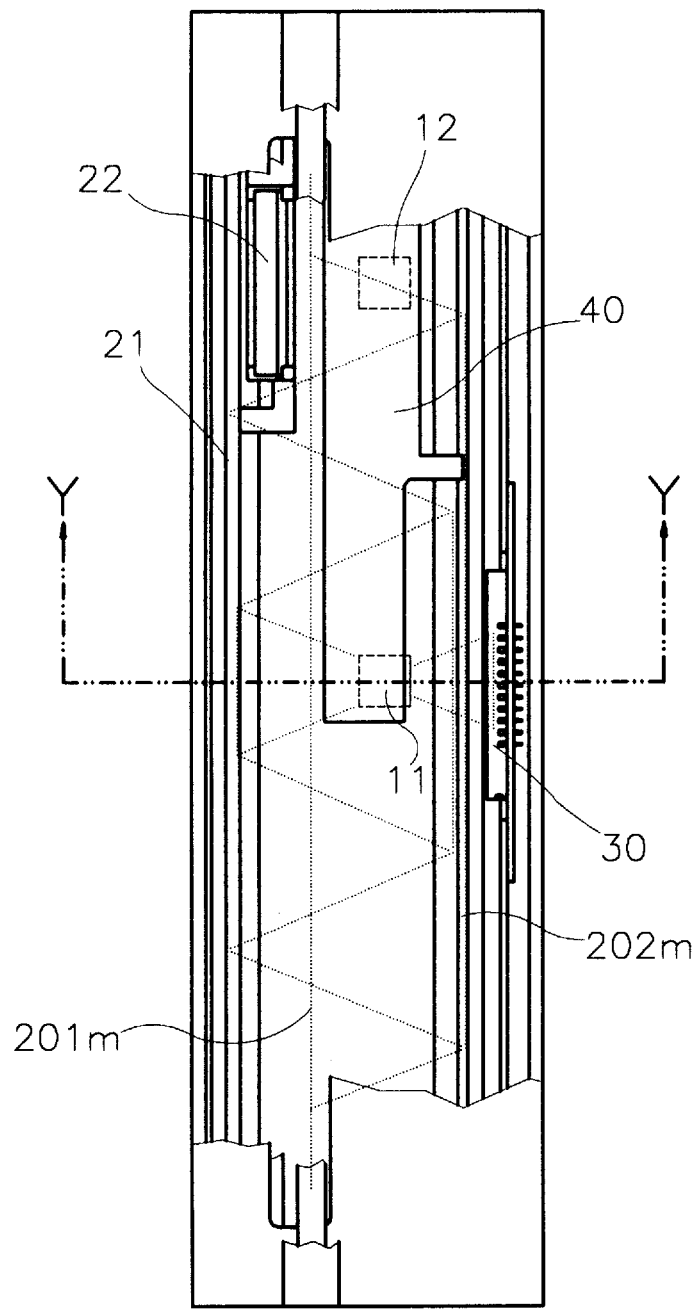
FIG. 25 is a schematic illustration of the structural parts in the low resolution state of the present invention in a seventh embodiment.
Figure 26:
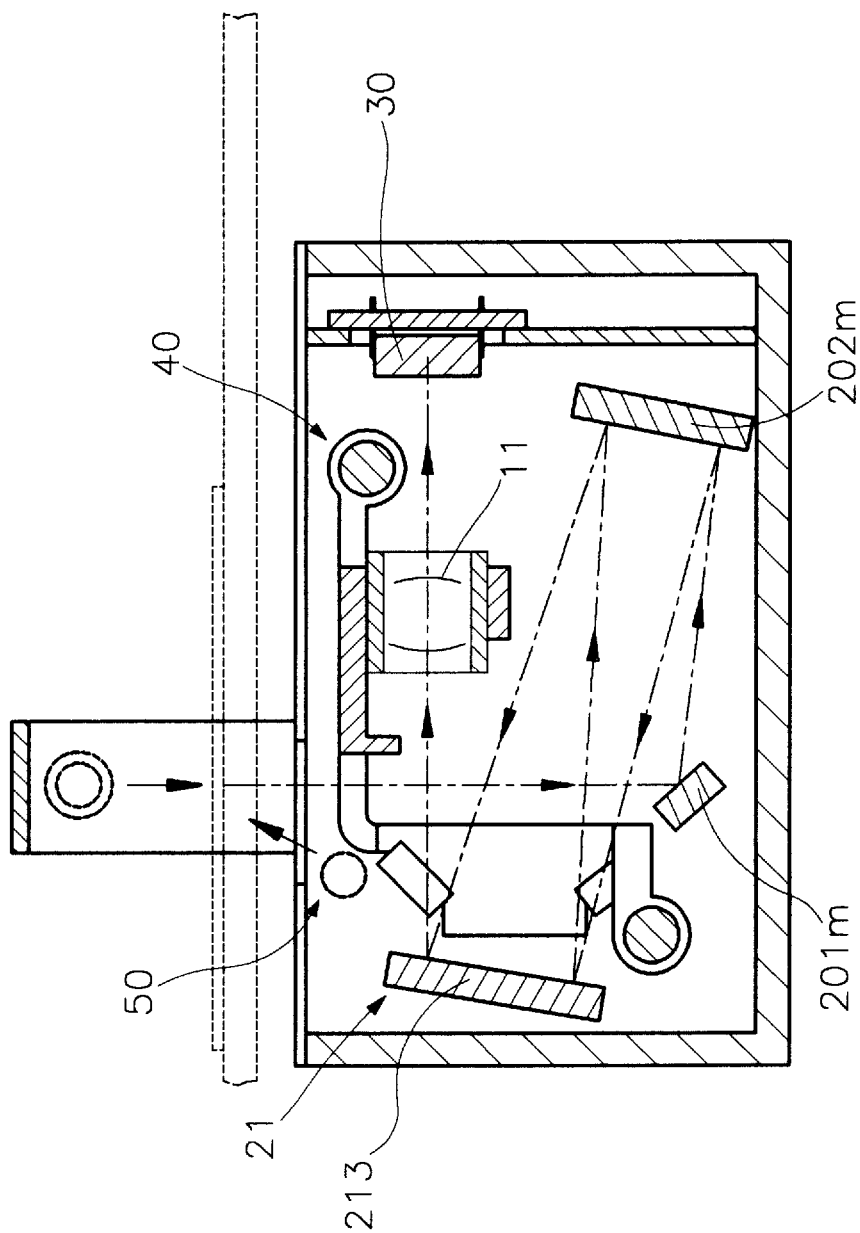
FIG. 26 is a cross-sectional view, taken along the line Y—Y in FIG. 25.
Figure 27:
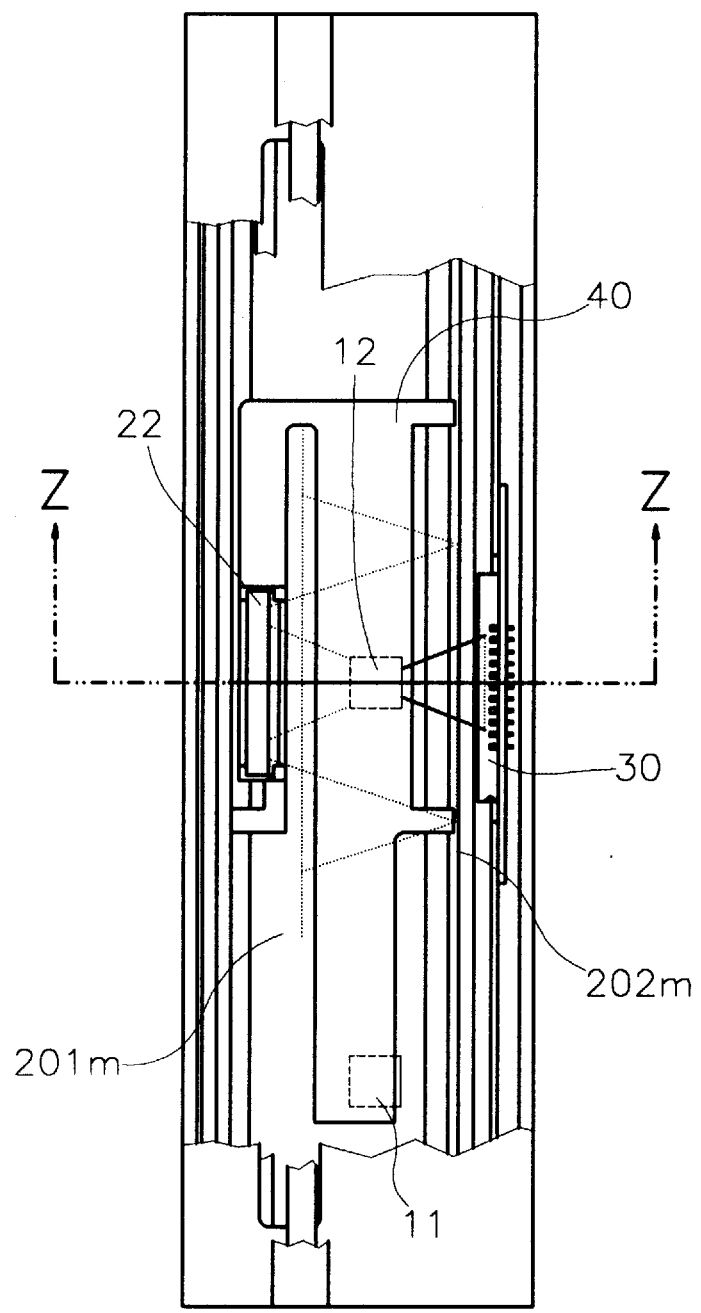
FIG. 27 is a schematic illustration of the structural parts in the high resolution state of the present invention in a seventh embodiment.
Figure 28:
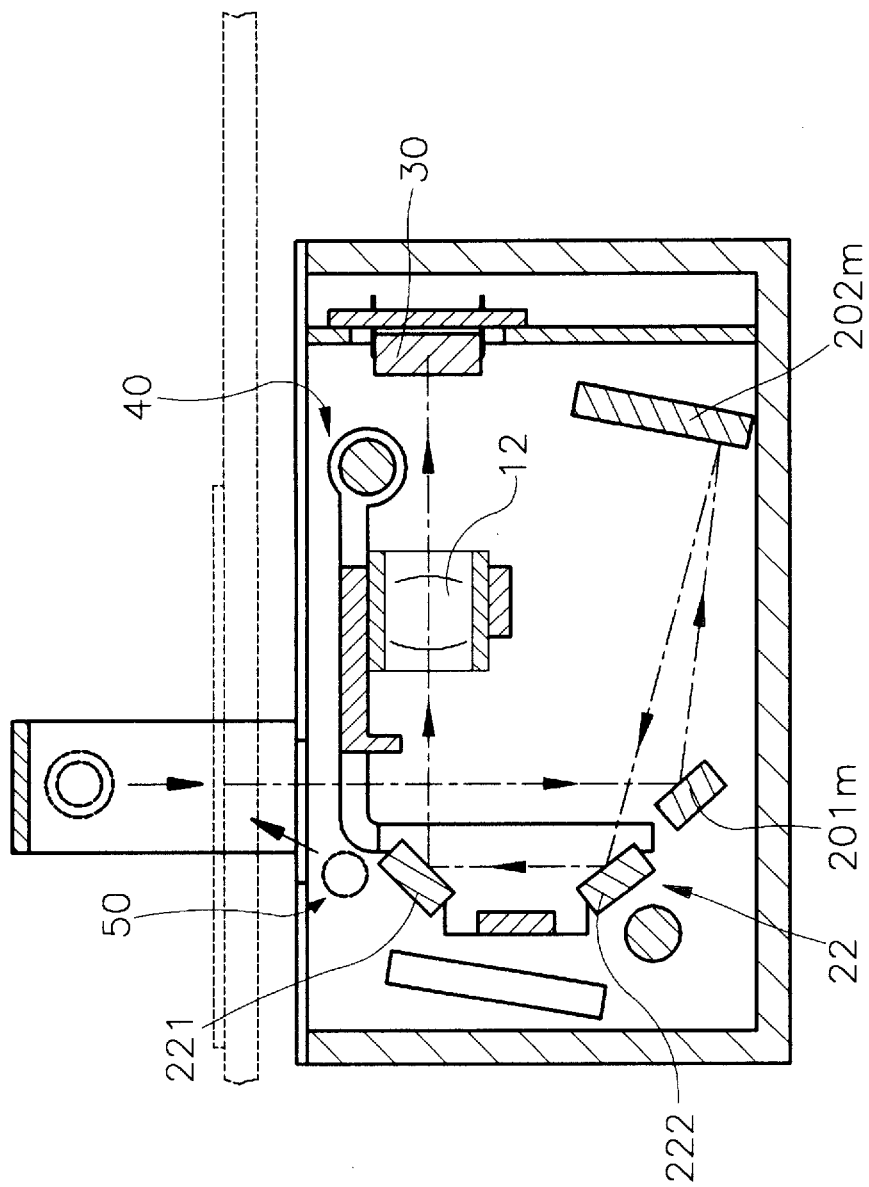
FIG. 28 is a cross-sectional view, taken along the line Z—Z in FIG. 27.
Figure 29:
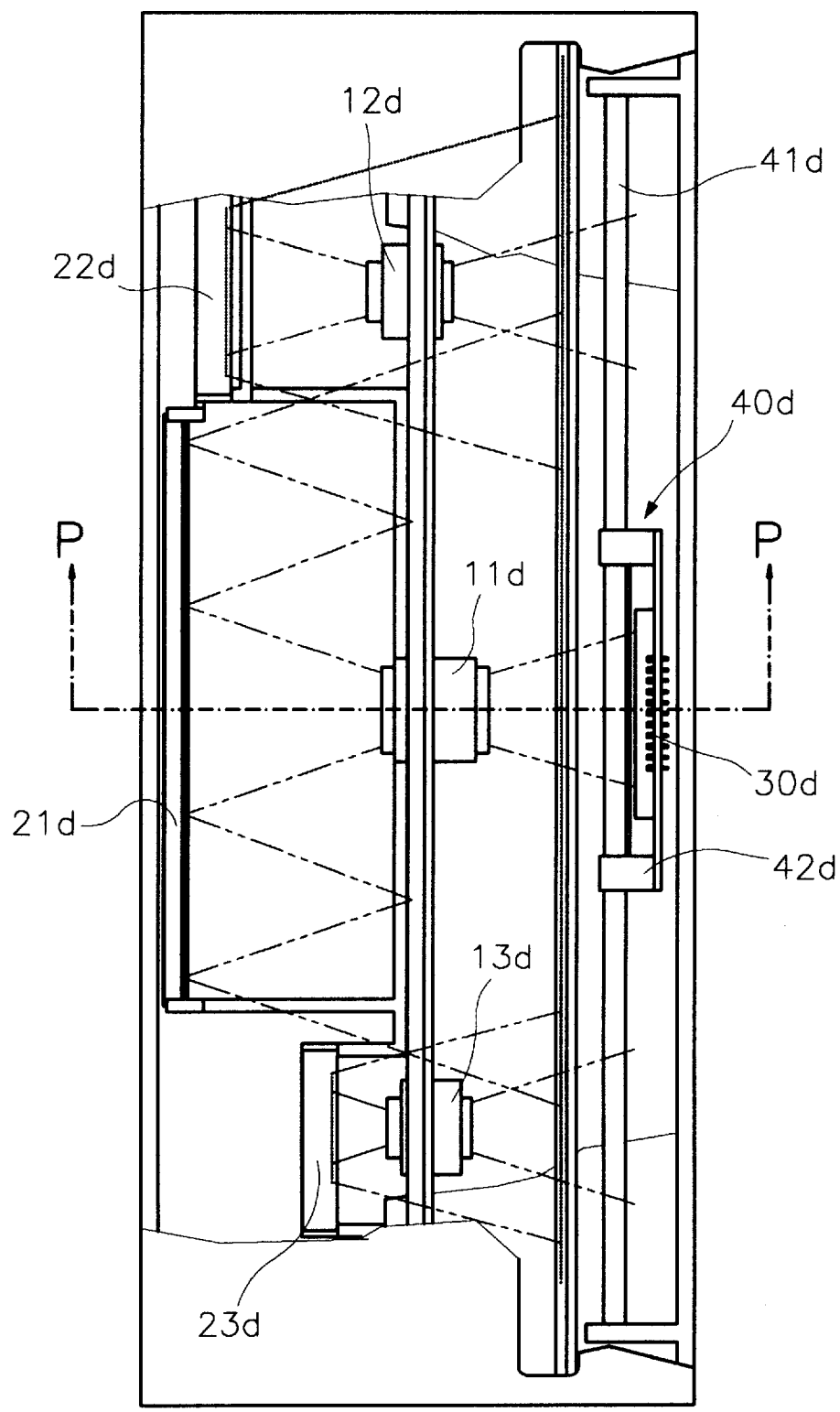
FIG. 29 is a schematic illustration of the structural parts in the low resolution state of the present invention in an eighth embodiment.
Figure 30:
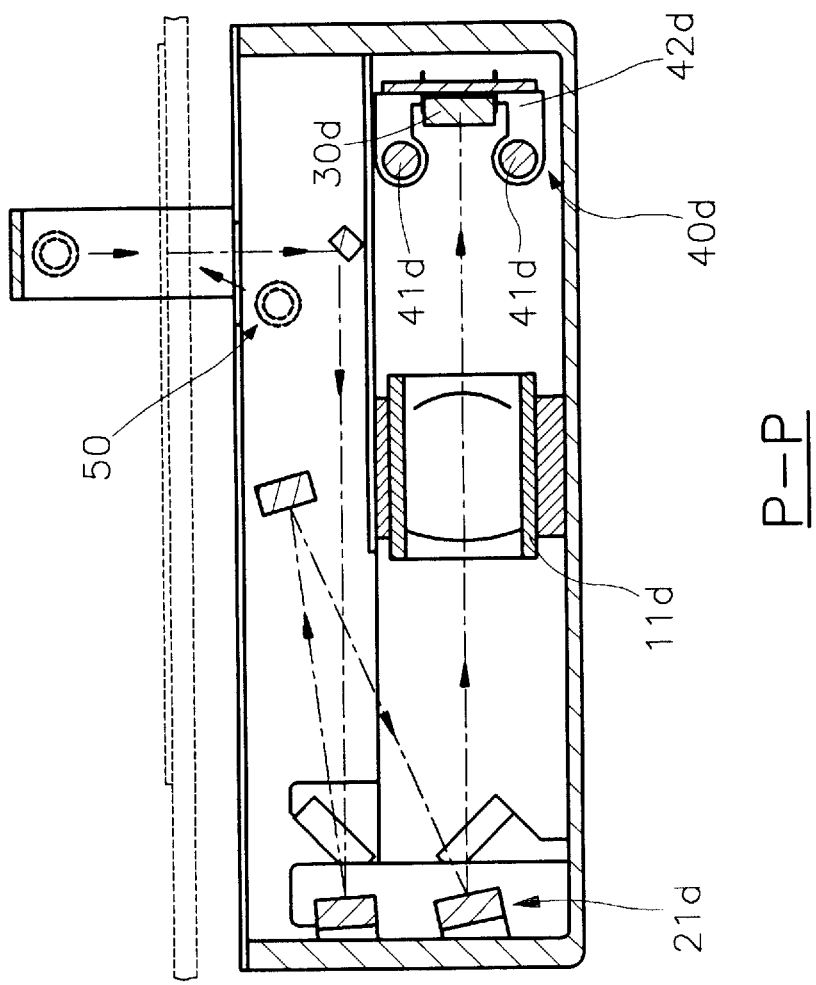
FIG. 30 is a cross-sectional view, taken along the line P—P in FIG. 29.
Figure 31:
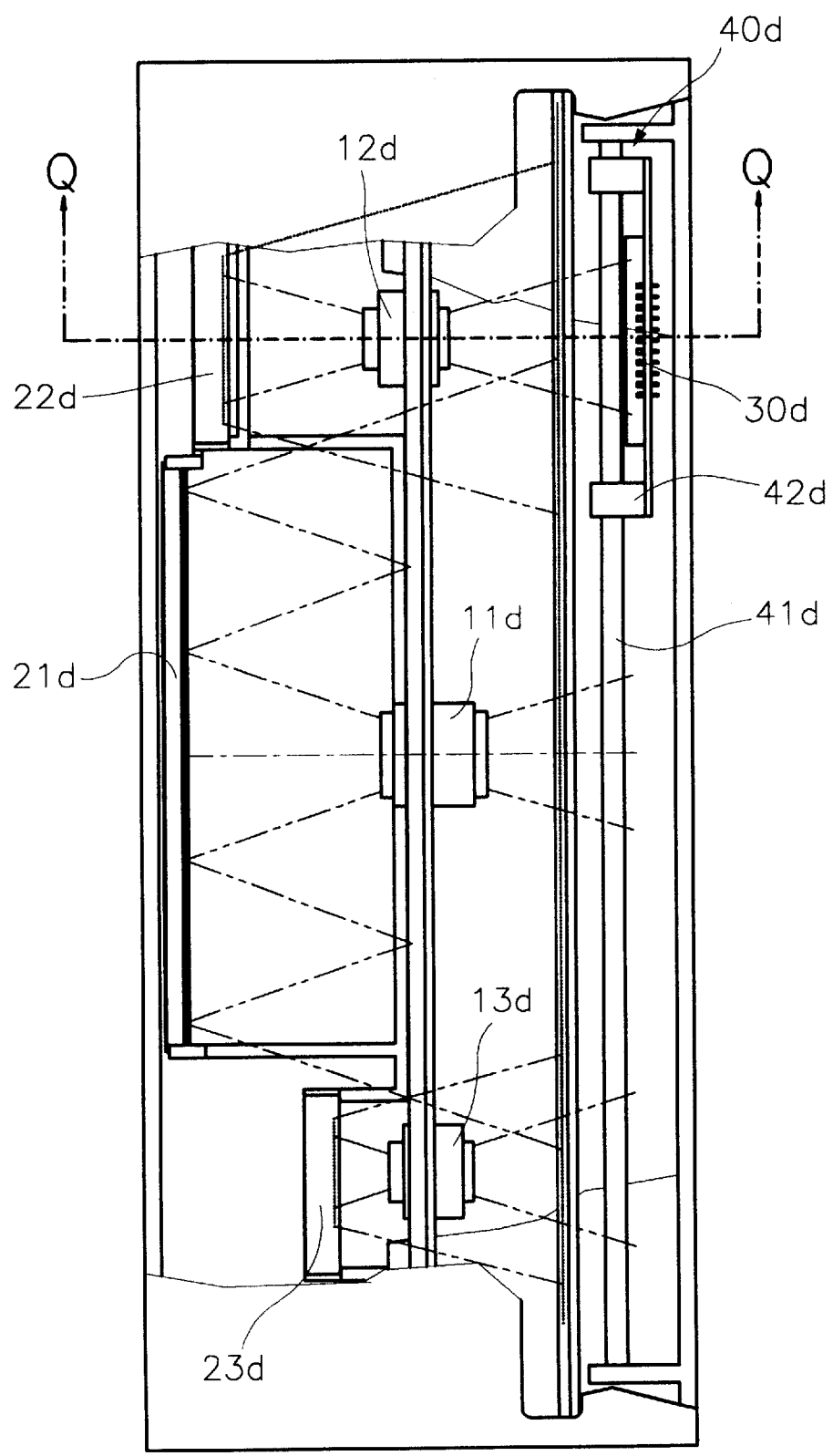
FIG. 31 is a schematic illustration of the structural parts in a higher resolution state of the present invention in an eighth embodiment.
Figure 32:
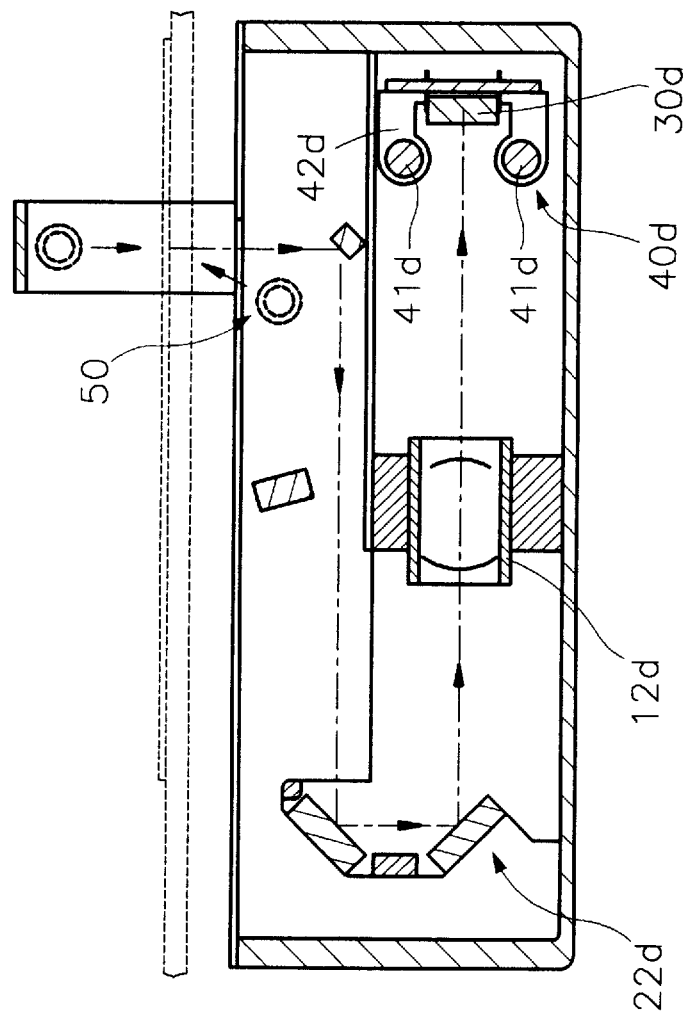
FIG. 32 is a cross-sectional view, taken along the line Q—Q in FIG. 31.
Figure 33:
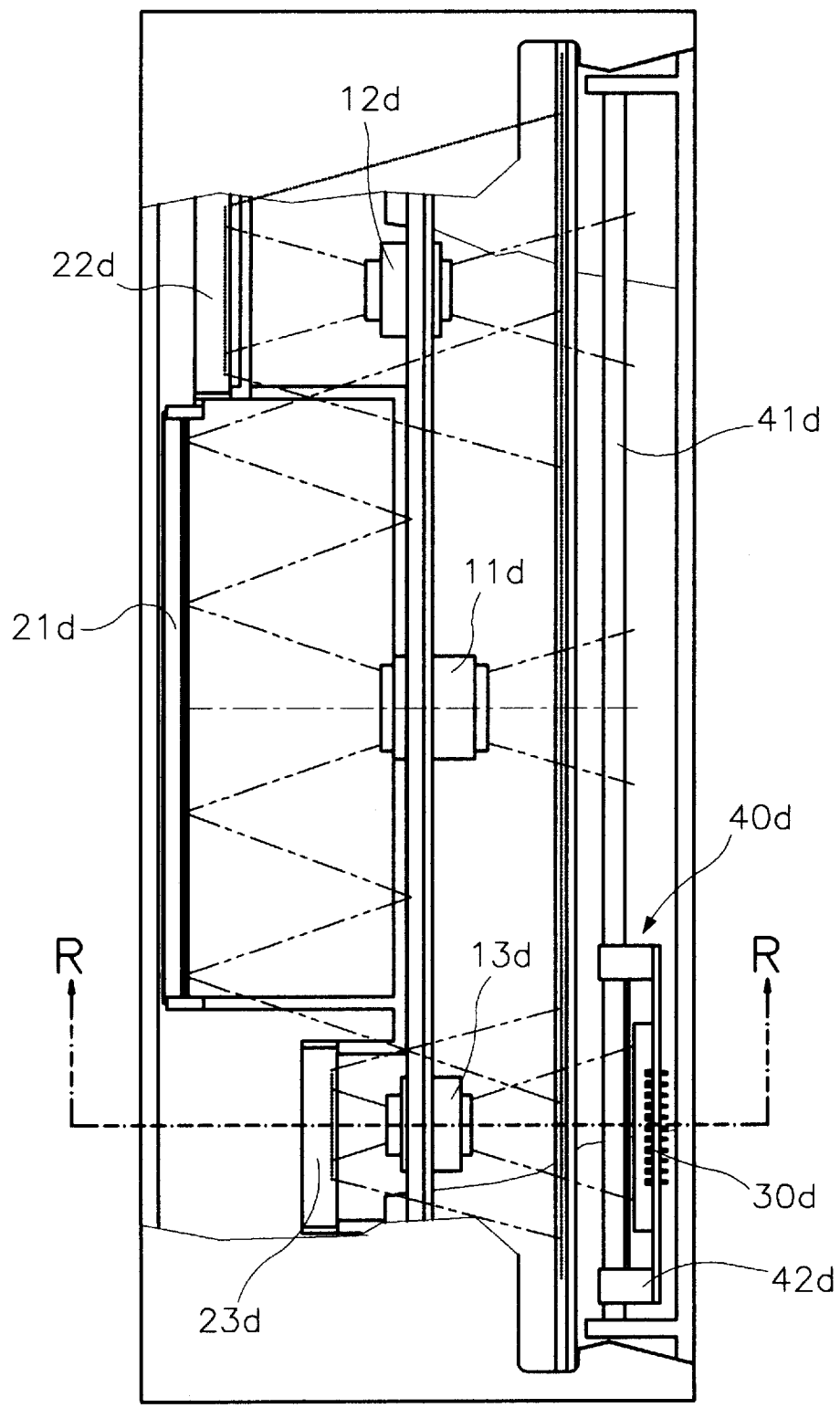
FIG. 33 is a schematic illustration of the structural parts in a still higher resolution state of the present invention in an eighth embodiment.
Figure 34:
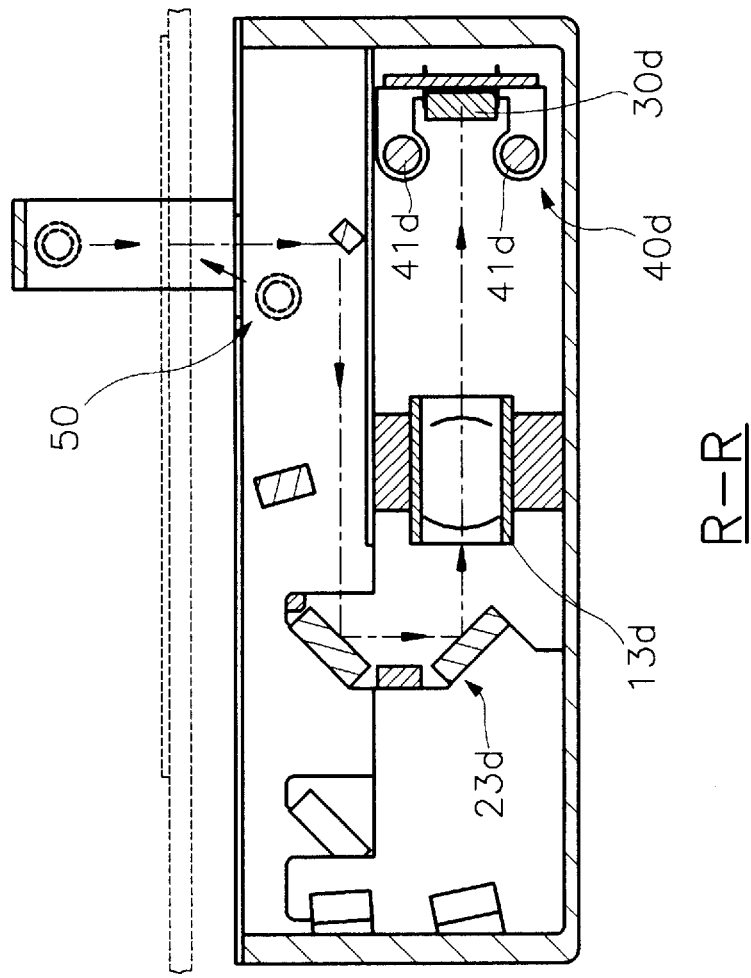
FIG. 34 is a cross-sectional view, taken along the line R—R in FIG. 33.

Referring to FIGS. 25–28, in a seventh embodiment of the present invention, the mirror group 21 has one mirror 213. The light source 50 illuminates the scanned area. At low resolution, from there, the light is reflected by a first fixed mirror 201m, a second fixed mirror 202m and the mirror 213 of the mirror group 21. The angle between the second fixed mirror 202m and the mirror 213 is small. So the light is reflected several times between the second fixed mirror 202m and the mirror 213. Then the light passes through lens 11 to reach the CCD 30 (as shown in FIGS. 25 and 26). At high resolution, the mirror group 22 and lens 12 are brought in a position opposite to the CCD 30. Then the light coming from the scanned area is reflected by the first fixed mirror, 201m, the second fixed mirror 202m, the lower mirror 222 and the upper mirror 221 of the mirror group 22. Finally, the light passes through lens 12 to reach the CCD 30 (as shown in FIGS. 27 and 28).

Referring to FIGS. 29–34, in an eighth embodiment, the image scanning module of the present invention allows for operation at three different resolutions. In this embodiment, the CCD 30 is movable, too. Three lenses 11d, 12d, 13d are mounted at nearly equal longitudinal positions. Three mirror groups 21d, 22d, 23d are mounted in front of the three lenses 11d, 12d, 13d, respectively, at suitable distances. A moving device 40d is installed behind the lenses 11d, 12d, 13d. It comprises several rails 41d in the transverse direction and a moving support 42d gliding thereon. A CCD 30 is mounted on the moving support 42d, thus gliding in the transverse direction. By positioning the CCD 30d opposite one of the lenses 11d, 12d, 13d, the resolution of the image scanning module of the present invention is controlled.

Figure 35:
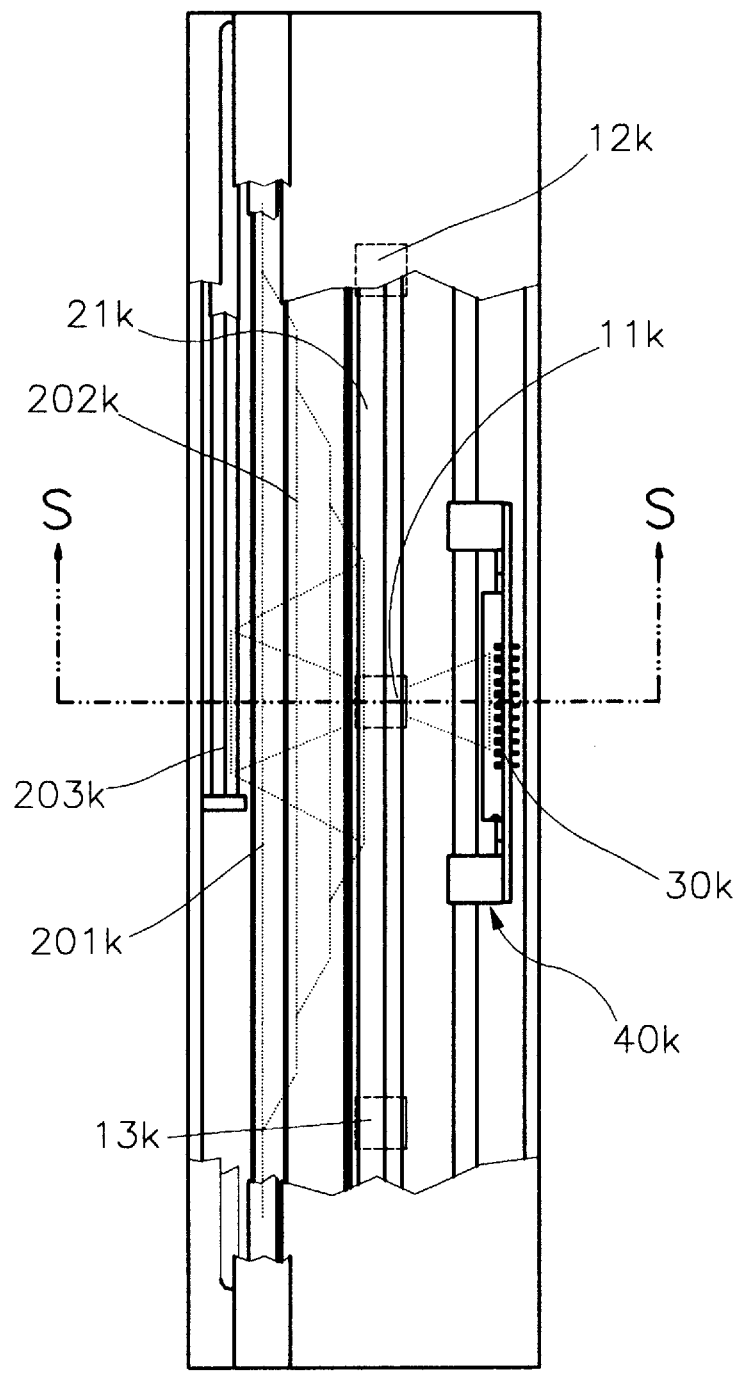
FIG. 35 is a schematic illustration of the structural parts in the low resolution state of the present invention in a ninth embodiment.
Figure 36:
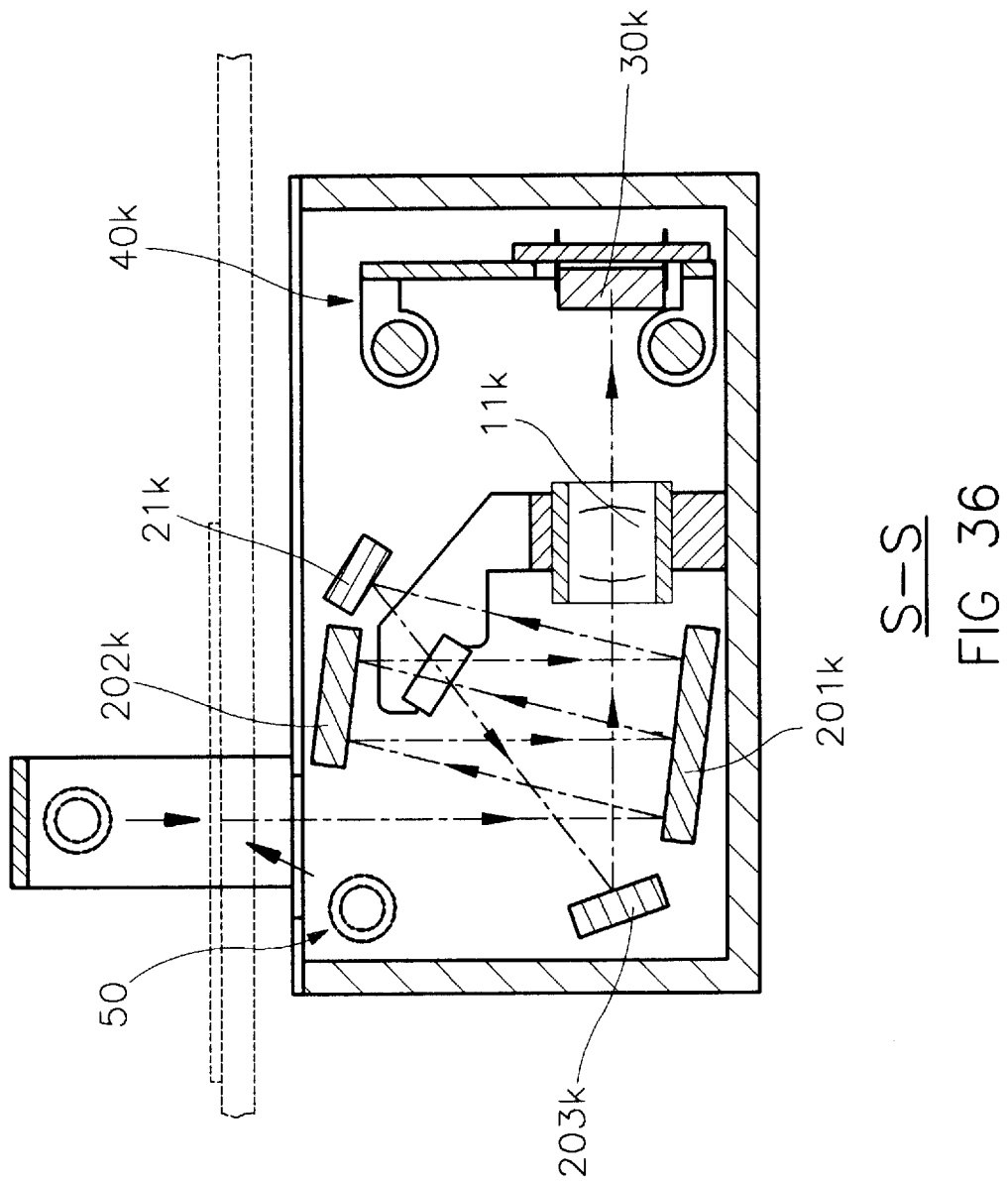
FIG. 36 is a cross-sectional view, taken along the line S—S in FIG. 35.
Figure 37:
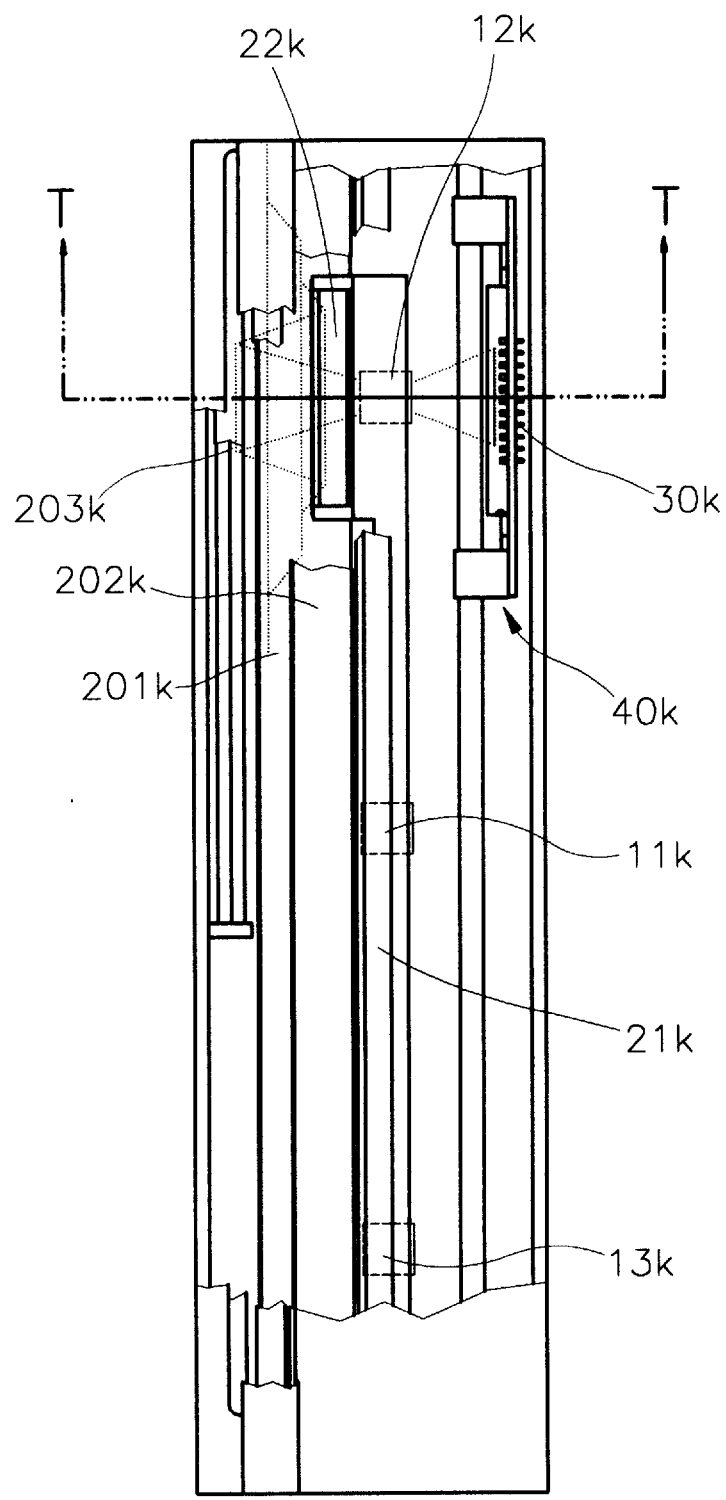
FIG. 37 is a schematic illustration of the structural parts in a higher resolution state of the present invention in a ninth embodiment.
Figure 38:
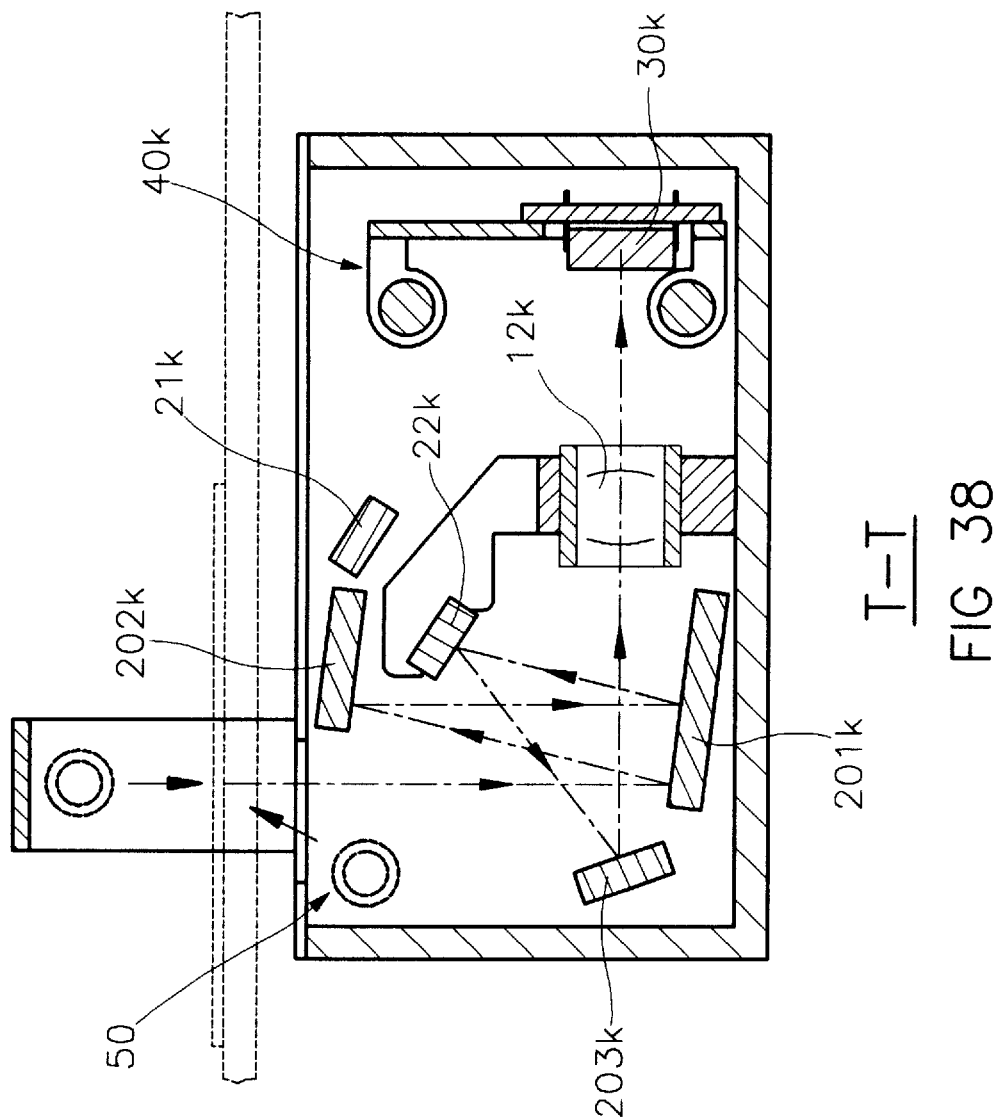
FIG. 38 is a cross-sectional view, taken along the line T—T in FIG. 37.
Figure 39:
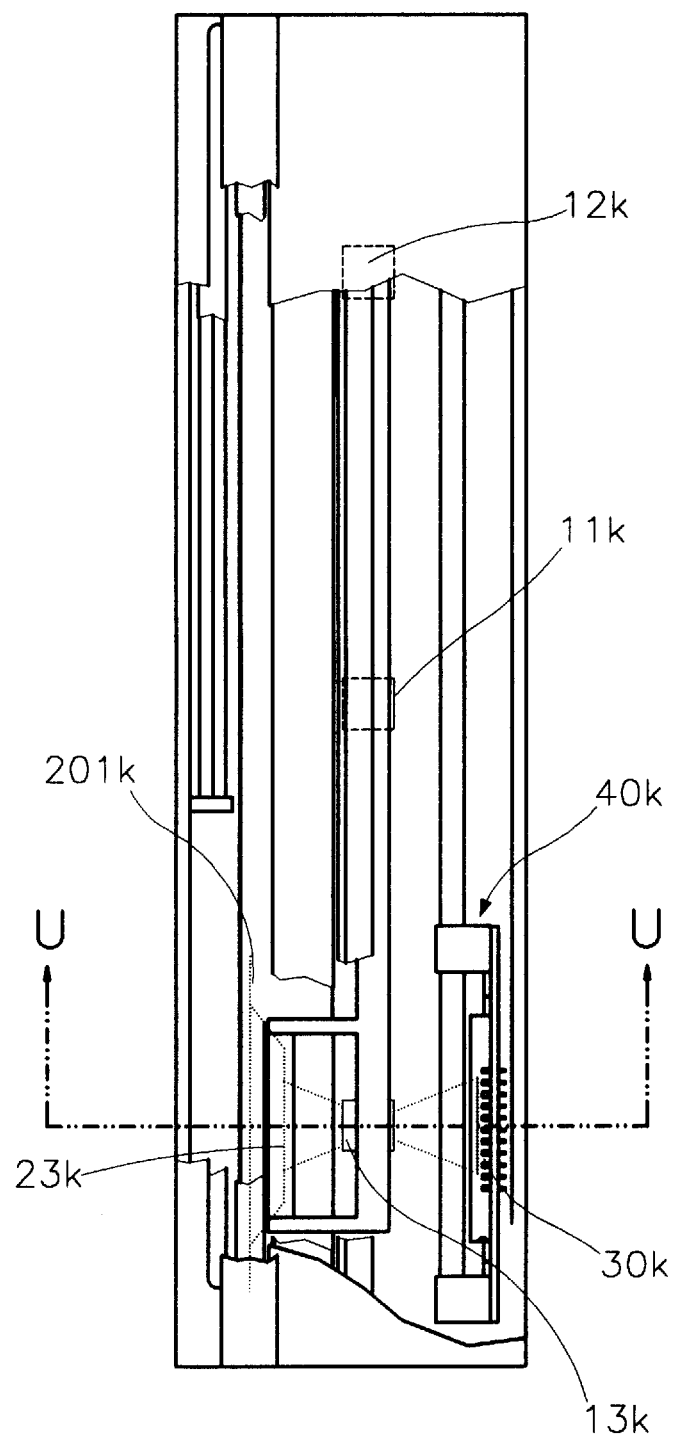
FIG. 39 is a schematic illustration of the structural parts in a still higher resolution state of the present invention in a ninth embodiment.
Figure 40:
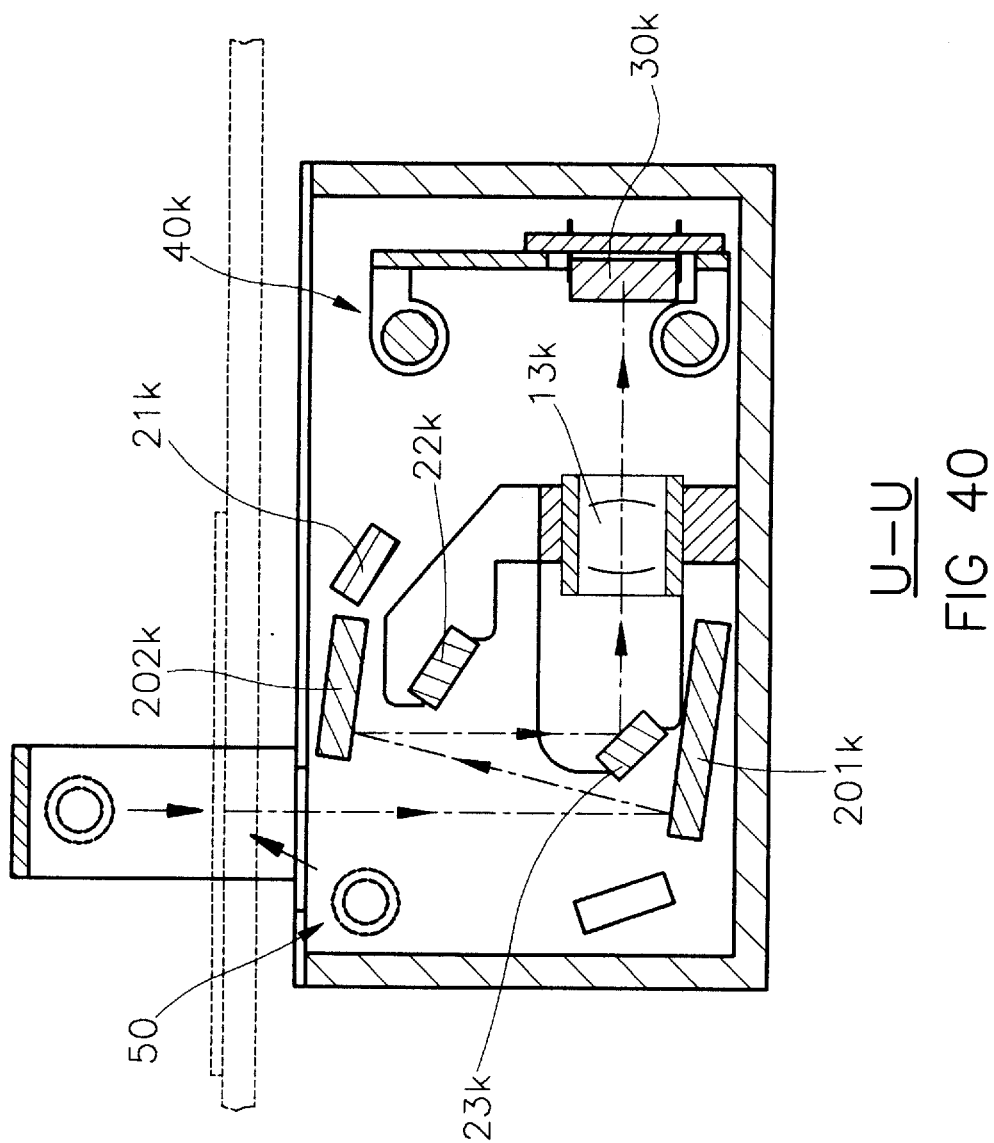
FIG. 40 is a cross-sectional view, taken along the line U—U in FIG. 39.

Referring to FIGS. 35–40, in an ninth embodiment, the image scanning module of the present invention allows for operation at three different resolutions. In this embodiment, the CCD 30 is movable, too. Three lenses 11k, 12k, 13k are mounted at nearly equal longitudinal positions. Three mirrors 21k, 22k, 23k are mounted the transversal positions of the three lenses 11k, 12k, 13k, respectively. A moving device 40k is installed behind the lenses 11k, 12k, 13k. It comprises several rails 41k in the transverse direction and a moving support 42k gliding thereon. A CCD 30 is mounted on the moving support 42k, thus gliding in the transverse direction. By positioning the CCD 30k opposite one of the lenses 11k, 12k, 13k, the resolution of the image scanning module of the present invention is controlled. At low resolution, when the CCD 30k is positioned behind lens 11k, the light coming from the scanned area is reflected by a first fixed mirror 201k and a second fixed mirror 202k. The angle between the first and second fixed mirrors 201k and 202k is small. So the light is reflected several times between the first and second fixed mirrors 201k and 202k. Then the light is reflected by the mirror 21k and by a third fixed mirror 203k and passes through lens 11k to reach the CCD 30k (as shown in FIGS. 35 and 36). At a higher resolution, the CCD 30k is positioned behind lens 12k, and the light is reflected by the first and second fixed mirrors 201k and 202k, the mirror 22k, the third fixed mirror 203k and then passes through lens 12k to reach the CCD 30k (as shown in FIGS. 37 and 38). At a still higher resolution, the CCD 30k is positioned behind lens 13k, and the light is reflected by the first and second fixed mirrors 201k and 202k and the mirror 23k, then passes through lens 13k to reach the CCD 30k (as shown in FIGS. 39 and 40).

Figure 41:
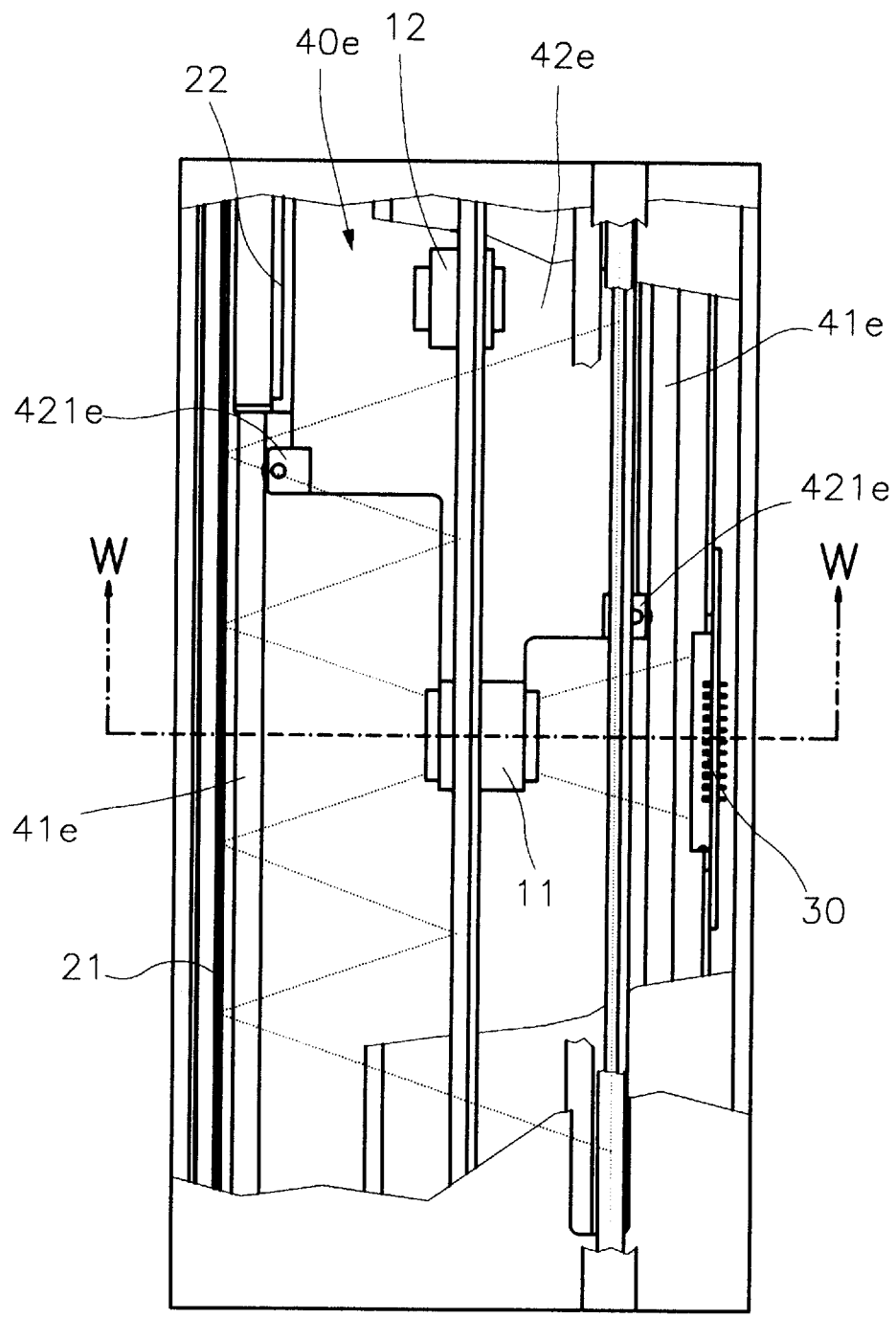
FIG. 41 is a schematic illustration of the moving parts of the present invention in a tenth embodiment.
Figure 42:
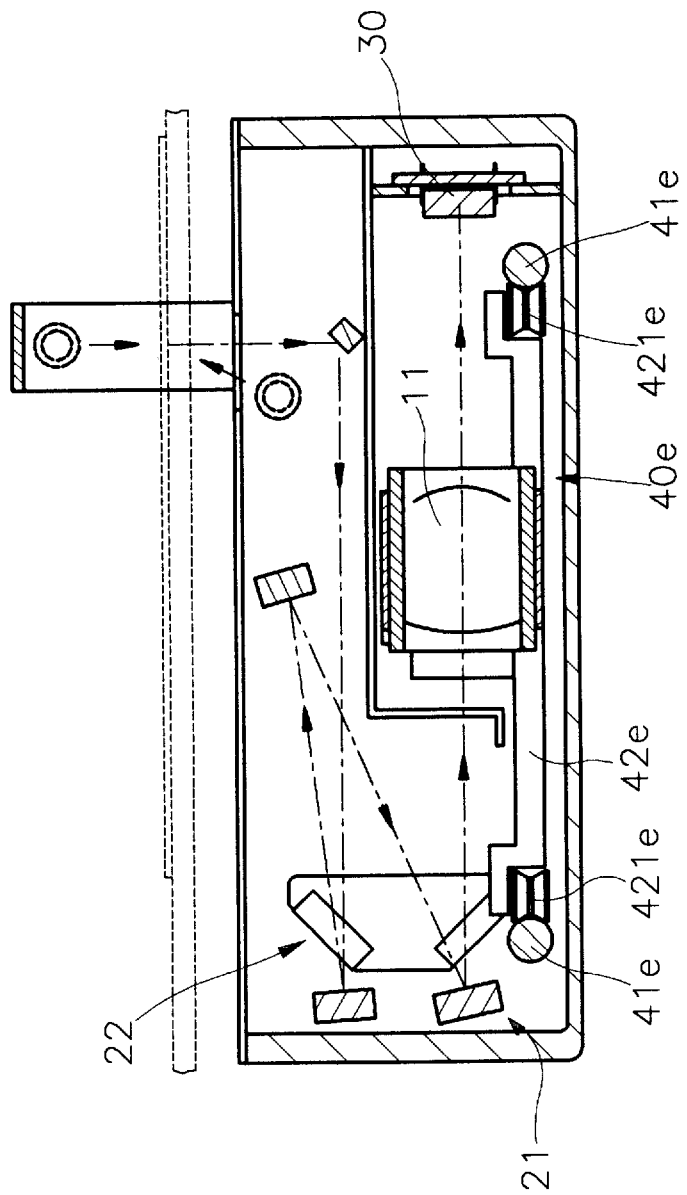
FIG. 42 is a cross-sectional view, taken along the line W—W in FIG. 41.

As shown in FIGS. 41 and 42, in a tenth embodiment, the image scanning module of the present invention has a moving device 40e, which comprises several rails 41e in the transverse direction and a moving support 42e with several wheels 421e, which roll along the rails 41e. The lenses 11, 12 and the mirror group 22 are mounted on the moving support 42e. By moving the moving support 42e along the rails 41e, the resolution of the image scanning module is changed.

Figure 43:
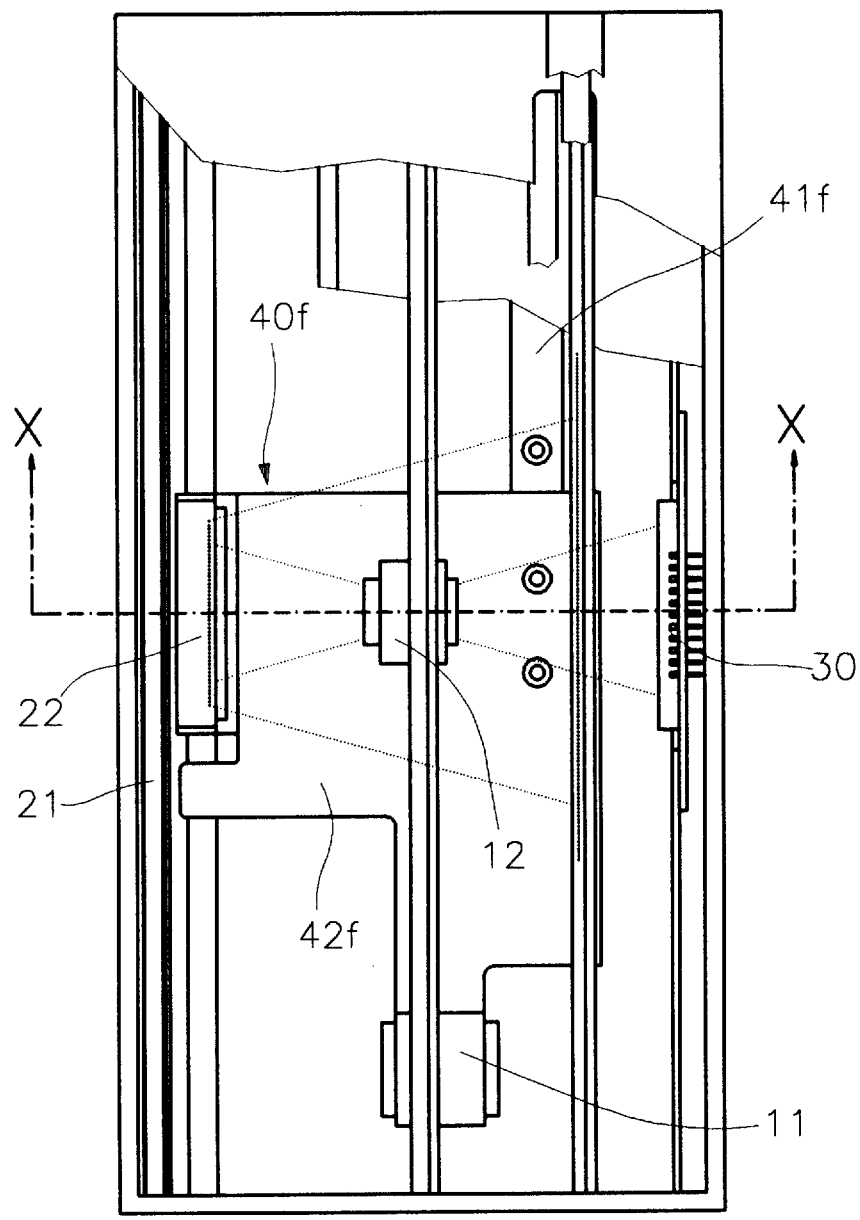
FIG. 43 is a schematic illustration of the moving parts of the present invention in an eleventh embodiment.
Figure 44:
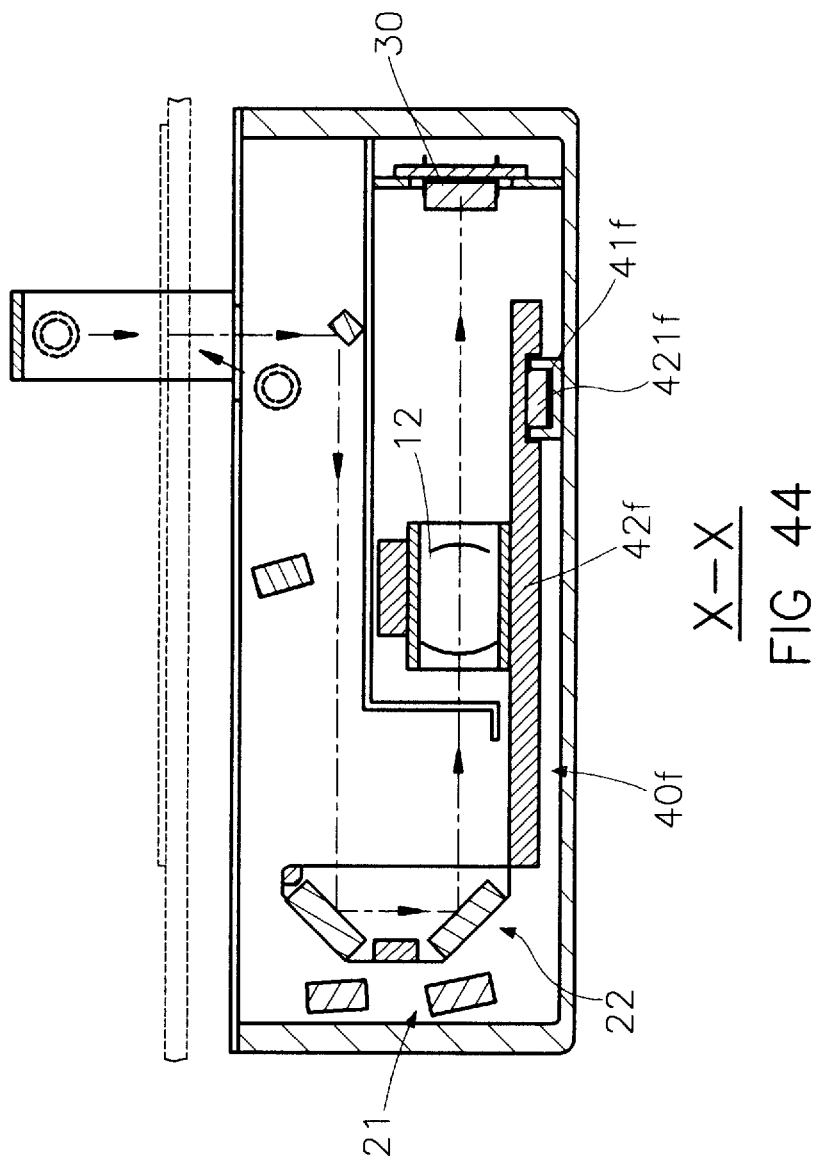
FIG. 44 is a cross-sectional view, taken along the line X—X in FIG. 43.

Referring to FIGS. 43 and 44, in an eleventh embodiment, the image scanning module of the present invention has a moving device 40f, which comprises several rails 41f in the transverse direction and a moving support 42f with several gliding pieces 421f. Each of the rails 41f is formed like a groove allowing one of the gliding pieces 421f to be accommodated and to glide therein. The lenses 11, 12 and the mirror group 22 are mounted on the moving support 42f. By moving the moving support 42f along the rails 41f, the resolution of the image scanning module is changed.

Figure 45:
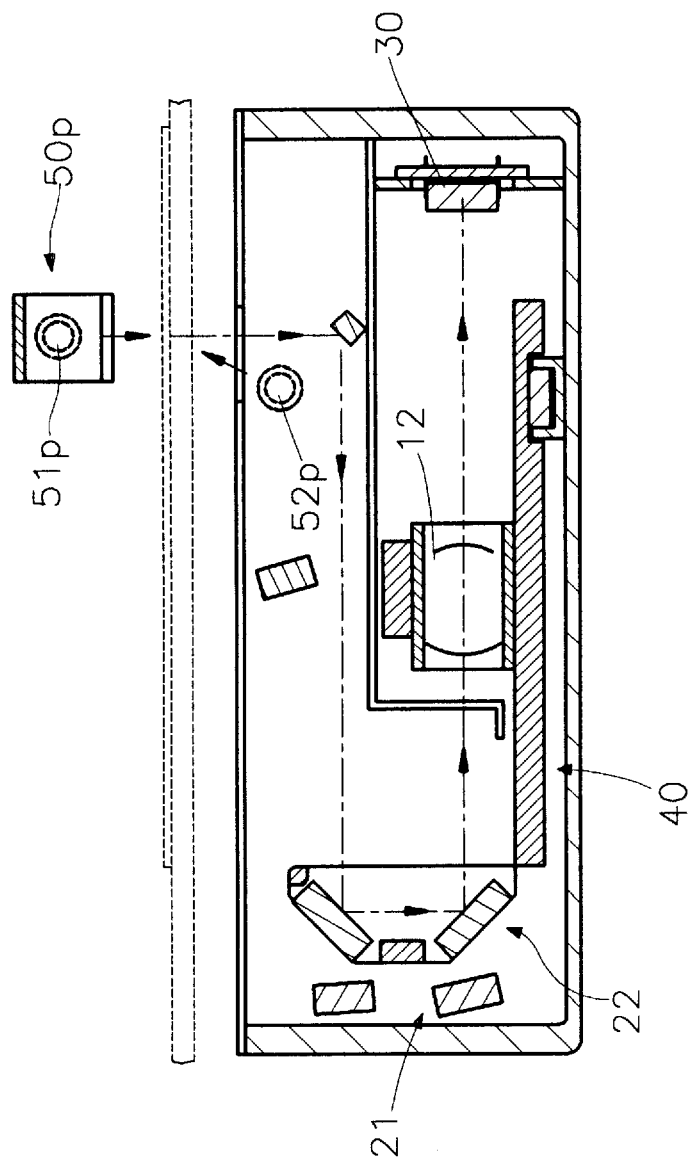
FIG. 45 is a schematic illustration of the present invention in a twelfth embodiment.
Figure 46:
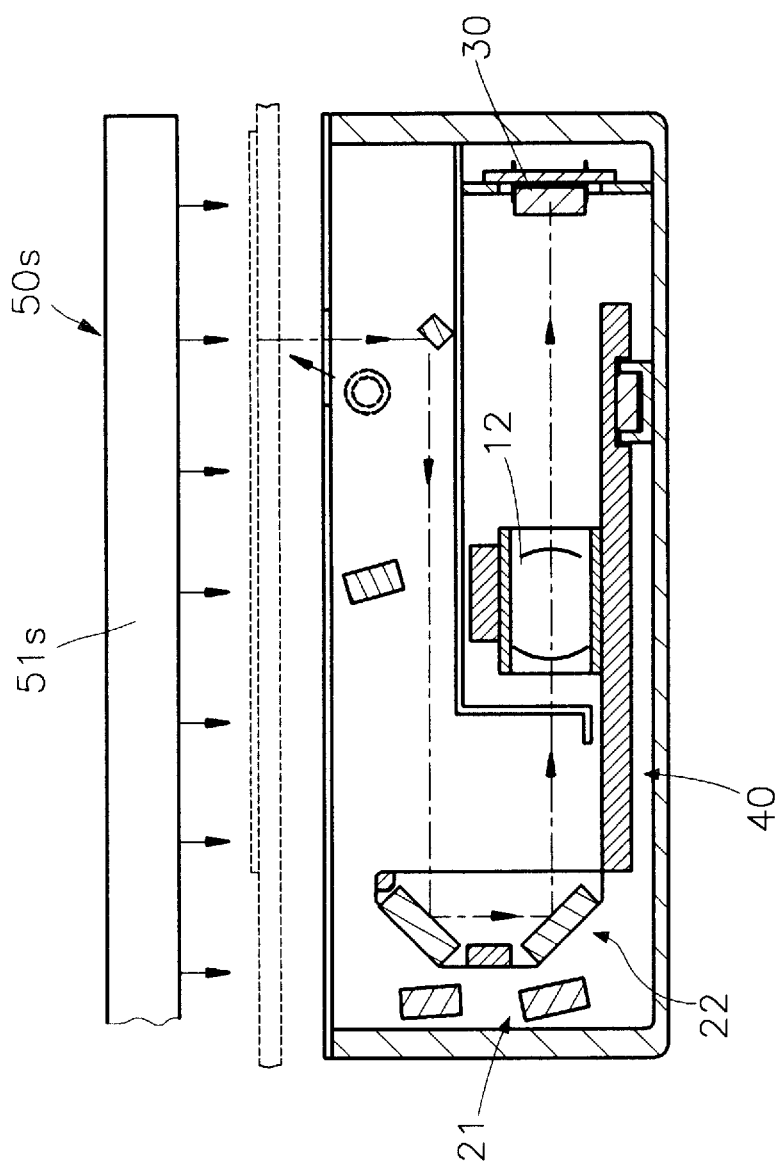
FIG. 46 is a schematic illustration of the present invention in a thirteenth embodiment.
Figure 47:
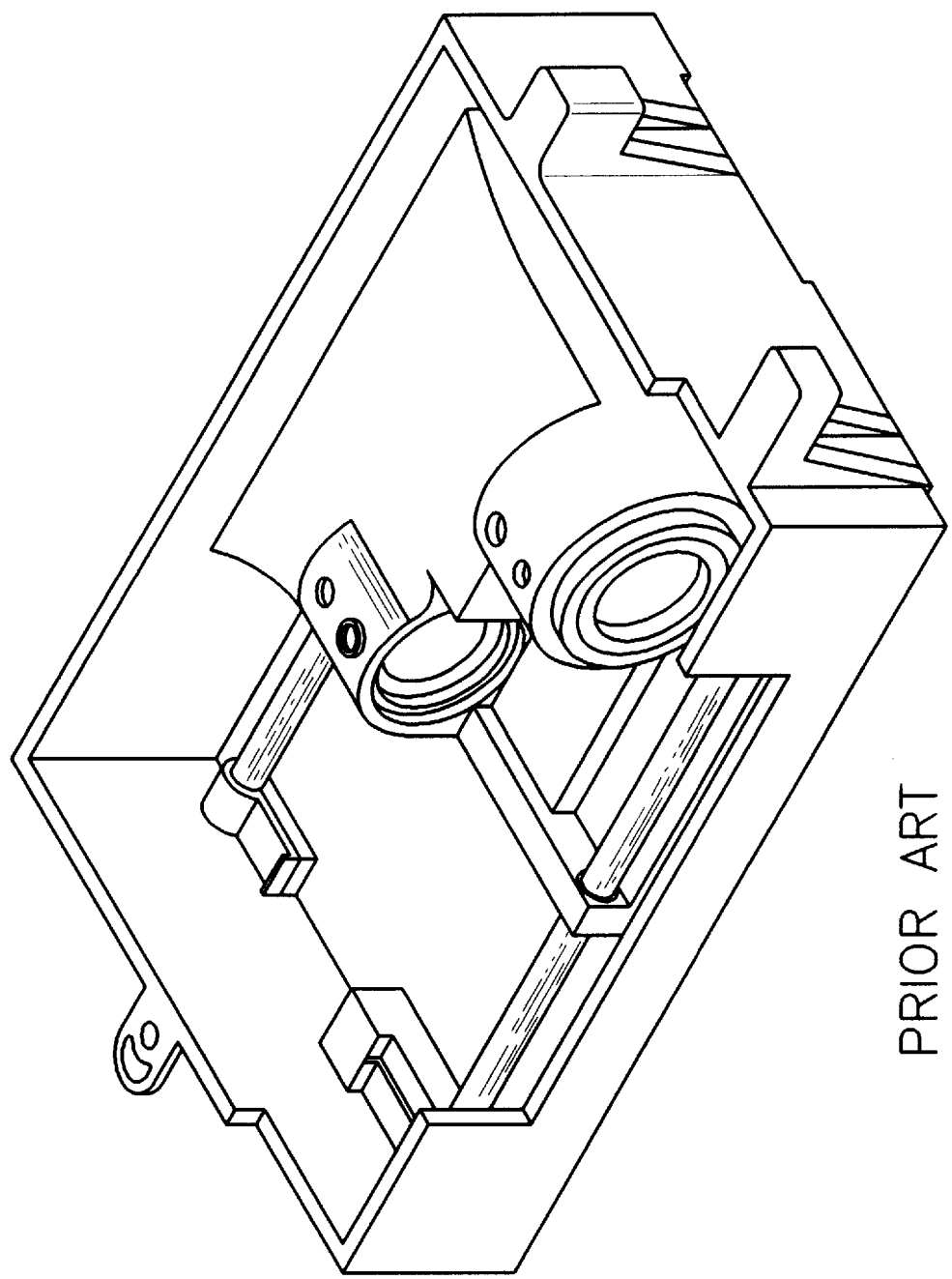
FIG. 47 (prior art) is a perspective view of the arrangement of the lenses of a conventional multiple resolution image scanning module.

Referring to FIGS. 45 and 46, in a twelfth and thirteenth embodiment, the image scanning module of the present invention has a different arrangement of light sources. In the twelfth embodiment a reflection light source 52p and, independently, a transmission light source 51p are installed. In the thirteenth embodiment, the transmission light source is a light box 51s. The light generated by the light source illuminates the scanned area, and from there it is reflected by one of the at least two mirror groups 21, 22 passes through one of the at least two lenses 11, 12 and reaches the CCD 30.

What is claimed is:

1. An image scanning module for creating an optical image of a scanned area illuminated by a light source, with light travelling from said scanned area to said optical image along a light path, said image scanning nodule operating at various resolutions and comprising:

a charge-coupled device, having a front side, with said light incident along a longitudinal direction onto said front side of said charge-coupled device;

at least two lenses, each having a front side and a back side, mounted at a mutual transverse distance in front of said charge-coupled device and being movable in a transverse direction, said at least two lenses alternatively brought into said light path, such that said light passes through one of said lenses from said front side to said back side and said optical image of said scanned area is created on said charge-coupled device;

at least two mirror groups, movable in said transverse direction and alternatively brought into said light path, with each of said lenses mounted behind one of said mirror groups on an equal transverse position; and a moving device, moving said lenses and said mirror groups simultaneously between transverse positions, wherein for each of said transverse positions, one of said mirror groups, one of said lenses and said charge-coupled device are aligned;

wherein for each of said transverse positions, said image scanning module operates at one of said various resolutions, with said light path having various lengths, such that for said various resolutions, said optical image of said scanned area has a nearly constant intensity.

2. An image scanning module according to claim 1, wherein said light source is a transmission light source or a reflection light source or is a lamp box.

3. An image scanning module according to claim 1, wherein said light source is a transmission light source, which comprises several single light sources on a panel or is a lamp box.

4. An image scanning module according to claim 1, wherein said light source is a transmission light source and a reflection light source.

5. An image scanning module according to claim 1, wherein said moving device has a moving support with a front end and a back end, said mirror groups being mounted on said front end and said lenses being mounted on said back end.

6. An image scanning module according to claim 5, wherein said at least two mirror groups except a fixed mirror group are movable mirror groups, mounted on said front end, with said fixed mirror group having a fixed transverse position.

7. An image scanning module according to claim 6, operating at a low resolution or at least one higher resolution, wherein at one of said higher resolutions, one of said movable mirror groups is brought into said light path.

8. An image scanning module according to claim 1, wherein said charge-coupled device is mounted on said moving device, moving in said transverse direction, so as to switch between said various resolutions.

9. An image scanning module according to claim 1, wherein said moving device has a moving support and several rails in said transverse direction, so as to guide a transverse movement of said moving support.

10. An image scanning module according to claim 9, wherein said moving support has several gliders, each of said gliders surrounding one of said rails on the cross-section thereof and gliding thereon.

11. An image scanning module according to claim 9, wherein said moving support has several wheels, each of said wheels resting on one of said rails and moving thereon.

12. An image scanning module according to claim 9, wherein said rails are formed as rods.

13. An image scanning module according to claim 9, wherein said rails are formed as grooves.

14. An image scanning module according to claim 13, wherein said moving support has several gliding pieces, each of said gliding pieces being accommodated in one of said rails and gliding therein.

* * * * *